US011300683B2

(12) United States Patent
Bao et al.

(10) Patent No.: US 11,300,683 B2
(45) Date of Patent: Apr. 12, 2022

(54) MULTIWAVELENGTH LIDAR DESIGN

(71) Applicant: INNOVUSION IRELAND LIMITED, Los Altos, CA (US)

(72) Inventors: Junwei Bao, Los Altos, CA (US); Yimin Li, Los Altos, CA (US); Rui Zhang, Los Altos, CA (US)

( * ) Notice: Subject to any disclaimer, the term of this patent is extended or adjusted under 35 U.S.C. 154(b) by 474 days.

(21) Appl. No.: 15/860,598

(22) Filed: Jan. 2, 2018

(65) Prior Publication Data

US 2018/0188371 A1 Jul. 5, 2018

Related U.S. Application Data

(60) Provisional application No. 62/477,740, filed on Mar. 28, 2017, provisional application No. 62/440,818, filed on Dec. 30, 2016.

(51) Int. Cl.
*G01C 3/08* (2006.01)
*G01S 17/87* (2020.01)
(Continued)

(52) U.S. Cl.
CPC ............. *G01S 17/87* (2013.01); *G01S 7/484* (2013.01); *G01S 7/487* (2013.01); *G01S 7/4818* (2013.01);
(Continued)

(58) Field of Classification Search
CPC ........ G01S 17/87; G01S 17/931; G01S 17/26; G01S 7/4818; G01S 7/484; G01S 7/4865; G01S 7/487; G01S 17/10; G01S 17/42
See application file for complete search history.

(56) References Cited

U.S. PATENT DOCUMENTS 5,006,721 A 4/1991 Cameron
5,157,451 A 10/1992 Taboada
(Continued)

FOREIGN PATENT DOCUMENTS

EP 1 237 305 A2 9/2002
EP 1 923 721 A1 5/2008
(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
(Continued)

*Primary Examiner* — Hovhannes Baghdasaryan
(74) *Attorney, Agent, or Firm* — Mauriel Kapouytian Woods LLP; Liang Huang; Andrew A. Noble

(57) ABSTRACT

A method for enabling light detection and ranging (LiDAR) scanning is provided. The method is performed by a system disposed or included in a vehicle. The method comprises receiving a first laser signal. The first laser signal has a first wavelength. The method further includes generating a second laser signal based on the first laser signal. The second laser signal has a second wavelength. The method further includes providing a plurality of third laser signals based on the second laser signal; and delivering a corresponding third laser signal of the plurality of third laser signals to a respective LiDAR scanner of the plurality of LiDAR scanners. Each of the LiDAR scanners are disposed at a separate location of the vehicle such that each of the LiDAR scanners is capable of scanning a substantial different spatial range from another LiDAR scanner. LiDAR systems can use multi-wavelength to provide other benefits as well.

14 Claims, 12 Drawing Sheets

(51) Int. Cl.

| | |
|---|---|
| *G01S 17/10* | (2020.01) |
| *G01S 7/487* | (2006.01) |
| *G01S 7/4865* | (2020.01) |
| *G01S 17/42* | (2006.01) |
| *G01S 7/481* | (2006.01) |
| *G01S 7/484* | (2006.01) |
| *G01S 17/26* | (2020.01) |
| *G01S 17/931* | (2020.01) |

(52) U.S. Cl.
CPC ............ *G01S 7/4865* (2013.01); *G01S 17/10* (2013.01); *G01S 17/26* (2020.01); *G01S 17/42* (2013.01); *G01S 17/931* (2020.01)

(56) References Cited

U.S. PATENT DOCUMENTS

| | | | |
|---|---|---|---|
| 5,442,358 A | 8/1995 | Keeler | |
| 5,546,188 A | 8/1996 | Wangler et al. | |
| 5,579,153 A | 11/1996 | Laming et al. | |
| 5,657,077 A | 8/1997 | Deangelis | |
| 5,793,491 A | 8/1998 | Wangler et al. | |
| 5,838,239 A | 11/1998 | Stern et al. | |
| 5,926,259 A | 7/1999 | Bamberger | |
| 6,163,378 A | 12/2000 | Khoury | |
| 6,317,202 B1 | 11/2001 | Hosokawa et al. | |
| 6,593,582 B2 | 7/2003 | Lee et al. | |
| 6,594,000 B2 | 7/2003 | Green | |
| 6,650,404 B1 | 11/2003 | Crawford | |
| 6,950,733 B2 | 9/2005 | Stopczynski | |
| 7,128,267 B2 | 10/2006 | Reichenbach et al. | |
| 7,202,941 B2 | 4/2007 | Munro | |
| 7,209,221 B2 | 4/2007 | Breed et al. | |
| 7,345,271 B2 | 3/2008 | Boehlau et al. | |
| 7,440,084 B2 | 10/2008 | Kane | |
| 7,440,175 B2 | 10/2008 | Di Teodoro | |
| 7,489,865 B2 | 2/2009 | Varshneya | |
| 7,576,837 B2 | 8/2009 | Liu | |
| 7,649,616 B2 | 1/2010 | Michael et al. | |
| 7,724,423 B2 | 5/2010 | Bollond et al. | |
| 7,830,527 B2 | 11/2010 | Chen | |
| 7,835,068 B1 | 11/2010 | Brooks | |
| 7,847,235 B2 | 12/2010 | Krupkin | |
| 7,880,865 B2 | 2/2011 | Tanaka et al. | |
| 7,936,448 B2 | 5/2011 | Albuquerque | |
| 7,969,558 B2 | 6/2011 | Hall | |
| 7,982,861 B2 | 7/2011 | Abshire | |
| 8,072,582 B2 | 12/2011 | Meneely | |
| 8,270,440 B2 | 9/2012 | Mizuuchi et al. | |
| 8,471,895 B2 | 6/2013 | Banks | |
| 8,736,818 B2 | 5/2014 | Weimer | |
| 8,749,764 B2 | 6/2014 | Hsu | |
| 8,812,149 B2 | 8/2014 | Doak | |
| 8,994,928 B2 | 3/2015 | Shiraishi | |
| 9,048,616 B1 | 6/2015 | Robinson | |
| 9,086,273 B1* | 7/2015 | Gruver .................. G01S 7/4815 | |
| 9,194,701 B2 | 11/2015 | Bösch | |
| 9,255,790 B2 | 2/2016 | Zhu | |
| 9,279,662 B2 | 3/2016 | Steffey et al. | |
| 9,300,321 B2 | 3/2016 | Zalik | |
| 9,304,316 B2 | 4/2016 | Weiss et al. | |
| 9,316,724 B2 | 4/2016 | Gehring et al. | |
| 9,354,485 B2 | 5/2016 | Fermann | |
| 9,510,505 B2 | 12/2016 | Halloran | |
| 9,515,451 B2 | 12/2016 | Zayhowski et al. | |
| 9,541,377 B1 | 1/2017 | Yee et al. | |
| 9,575,184 B2 | 2/2017 | Gilliland | |
| 9,605,998 B2 | 3/2017 | Nozawa | |
| 9,621,876 B2 | 4/2017 | Federspiel | |
| 9,638,799 B2 | 5/2017 | Goodwin | |
| 9,680,280 B2 | 6/2017 | Natl et al. | |
| 9,696,426 B2 | 7/2017 | Zuk | |
| 9,702,966 B2 | 7/2017 | Batcheller | |
| 9,755,397 B2 | 9/2017 | Ogaki | |
| 9,823,353 B2 | 11/2017 | Eichenholz | |
| 9,869,754 B1 | 1/2018 | Campbell | |
| 9,880,263 B2 | 1/2018 | Droz | |
| 9,885,778 B2 | 2/2018 | Dussan | |
| 9,897,689 B2 | 2/2018 | Dussan | |
| 9,915,726 B2 | 3/2018 | Bailey | |
| 9,927,915 B2 | 3/2018 | Frame | |
| 9,940,761 B2 | 4/2018 | Kundu et al. | |
| 10,042,159 B2 | 8/2018 | Dussan et al. | |
| 10,061,019 B1 | 8/2018 | Campbell et al. | |
| 10,073,166 B2 | 9/2018 | Dussan | |
| 10,094,925 B1 | 10/2018 | LaChapelle | |
| 10,137,903 B2 | 11/2018 | Tascione et al. | |
| 10,157,630 B2 | 12/2018 | Vaughn | |
| 10,191,155 B2 | 1/2019 | Curatu | |
| 10,215,847 B2 | 2/2019 | Scheim | |
| 10,295,656 B2 | 5/2019 | Li et al. | |
| 10,310,058 B1 | 6/2019 | Campbell et al. | |
| 10,324,170 B1 | 6/2019 | Engberg, Jr. et al. | |
| 10,324,185 B2 | 6/2019 | McWhirter et al. | |
| 10,393,877 B2 | 8/2019 | Hall et al. | |
| 10,429,495 B1 | 10/2019 | Wang et al. | |
| 10,451,716 B2 | 10/2019 | Hughes et al. | |
| 10,502,831 B2 | 12/2019 | Eichenholz | |
| 10,557,923 B2 | 2/2020 | Watnik | |
| 10,557,940 B2 | 2/2020 | Eichenholz et al. | |
| 10,571,567 B2 | 2/2020 | Campbell et al. | |
| 10,578,720 B2 | 3/2020 | Hughes et al. | |
| 10,591,600 B2 | 3/2020 | Villeneuve | |
| 10,627,491 B2 | 4/2020 | Hall et al. | |
| 10,641,872 B2 | 5/2020 | Dussan et al. | |
| 10,663,564 B2 | 5/2020 | LaChapelle | |
| 10,663,585 B2 | 5/2020 | McWhirter | |
| 10,663,596 B2 | 5/2020 | Dussan et al. | |
| 10,684,360 B2 | 6/2020 | Campbell | |
| 10,908,262 B2 | 2/2021 | Dussan | |
| 10,969,475 B2 | 4/2021 | Li et al. | |
| 10,983,218 B2 | 4/2021 | Hall et al. | |
| 11,002,835 B2 | 5/2021 | Pan et al. | |
| 11,009,605 B2 | 5/2021 | Li et al. | |
| 11,022,688 B2 | 6/2021 | Eichenholz et al. | |
| 11,022,689 B2 | 6/2021 | Villeneuve et al. | |
| 11,025,885 B2 | 6/2021 | Pacala et al. | |
| 11,029,394 B2 | 6/2021 | Li et al. | |
| 11,029,406 B2 | 6/2021 | LaChapelle | |
| 2002/0136251 A1 | 9/2002 | Green | |
| 2004/0135992 A1 | 7/2004 | Munro | |
| 2005/0033497 A1* | 2/2005 | Stopczynski ......... G01S 13/931 | 701/45 |
| 2005/0190424 A1 | 9/2005 | Reichenbach et al. | |
| 2006/0071846 A1* | 4/2006 | Yanagisawa .......... G01S 7/4818 | 342/54 |
| 2006/0132752 A1 | 6/2006 | Kane | |
| 2007/0091948 A1 | 4/2007 | Di Teodoro | |
| 2008/0174762 A1 | 7/2008 | Liu | |
| 2009/0010644 A1 | 1/2009 | Varshneya | |
| 2009/0051926 A1 | 2/2009 | Chen | |
| 2009/0059201 A1 | 3/2009 | Willner | |
| 2009/0147239 A1* | 6/2009 | Zhu ........................ G01S 17/87 | 356/3.12 |
| 2009/0262760 A1 | 10/2009 | Krupkin | |
| 2010/0006760 A1 | 1/2010 | Lee | |
| 2010/0020306 A1 | 1/2010 | Hall | |
| 2010/0027602 A1 | 2/2010 | Abshire | |
| 2010/0045965 A1 | 2/2010 | Meneely | |
| 2010/0128109 A1 | 5/2010 | Banks | |
| 2010/0271614 A1 | 10/2010 | Albuquerque | |
| 2012/0038903 A1 | 2/2012 | Weimer | |
| 2012/0124113 A1 | 5/2012 | Zalik | |
| 2012/0221142 A1 | 8/2012 | Doak | |
| 2013/0107016 A1 | 5/2013 | Federspiel | |
| 2013/0293867 A1 | 11/2013 | Hsu | |
| 2013/0293946 A1* | 11/2013 | Fermann .................. G02F 1/39 | 359/330 |
| 2014/0078514 A1 | 3/2014 | Zhu | |
| 2014/0347650 A1 | 11/2014 | Bosch Thomas | |
| 2014/0350836 A1* | 11/2014 | Stettner .................. G01S 7/489 | 701/301 |
| 2015/0078123 A1 | 3/2015 | Batcheller | |
| 2015/0084805 A1 | 3/2015 | Dawber | |

(56) References Cited

U.S. PATENT DOCUMENTS

| | | |
|---|---|---|
| 2015/0116692 A1 | 4/2015 | Zuk |
| 2015/0139259 A1 | 5/2015 | Robinson |
| 2015/0355327 A1 | 12/2015 | Goodwin |
| 2016/0003946 A1 | 1/2016 | Gilliland |
| 2016/0047896 A1 | 2/2016 | Dussan |
| 2016/0047900 A1 | 2/2016 | Dussan |
| 2016/0061655 A1* | 3/2016 | N Ozawa .............. G01S 7/4802 250/578.1 |
| 2016/0061935 A1* | 3/2016 | McCloskey ........... G01S 13/345 342/82 |
| 2016/0100521 A1* | 4/2016 | Halloran ................ G01S 13/46 180/169 |
| 2016/0117048 A1 | 4/2016 | Frame |
| 2016/0245902 A1 | 8/2016 | Watnik |
| 2016/0291134 A1 | 10/2016 | Droz |
| 2016/0313445 A1 | 10/2016 | Bailey |
| 2016/0327646 A1 | 11/2016 | Scheim |
| 2017/0153319 A1* | 6/2017 | Villeneuve .......... H01S 3/08086 |
| 2017/0299721 A1 | 10/2017 | Eichenholz |
| 2017/0365105 A1 | 12/2017 | Rao et al. |
| 2018/0158471 A1 | 6/2018 | Vaughn |
| 2018/0188355 A1 | 7/2018 | Bao |
| 2018/0188357 A1 | 7/2018 | Li |
| 2018/0188358 A1 | 7/2018 | Li |
| 2018/0188371 A1 | 7/2018 | Bao |
| 2018/0210084 A1 | 7/2018 | Zwölfer et al. |
| 2018/0275274 A1 | 9/2018 | Bao |
| 2018/0329060 A1 | 11/2018 | Pacala et al. |
| 2018/0359460 A1 | 12/2018 | Pacala et al. |
| 2019/0025428 A1 | 1/2019 | Li |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0250254 A1 | 8/2019 | Campbell et al. |
| 2019/0257924 A1 | 8/2019 | Li |
| 2019/0265334 A1 | 8/2019 | Zhang |
| 2019/0265336 A1 | 8/2019 | Zhang |
| 2019/0265337 A1 | 8/2019 | Zhang |
| 2019/0265339 A1 | 8/2019 | Zhang |
| 2019/0277952 A1 | 9/2019 | Friedrichshafen et al. |
| 2019/0369215 A1 | 12/2019 | Wang et al. |
| 2019/0369258 A1 | 12/2019 | Hall et al. |
| 2020/0142070 A1 | 5/2020 | Hall et al. |
| 2020/0227882 A1 | 7/2020 | Zhang et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| EP | 2 157 445 A2 | 2/2010 |
| EP | 2 395 368 A1 | 12/2011 |
| EP | 2889642 A1 | 7/2015 |
| GB | 2000411 A | 1/1979 |
| JP | 2005-9956 A | 1/2005 |
| JP | 2007-144667 A | 6/2007 |
| JP | 2010-35385 A | 2/2010 |
| JP | 2010-85316 A | 4/2010 |
| JP | 2016-14665 A | 1/2016 |
| JP | 2017-138301 A | 8/2017 |
| JP | 2002-221574 A | 8/2020 |
| KR | 2013-0068224 A | 6/2013 |
| KR | 2018-0107673 A | 10/2018 |
| WO | 2014/203654 A1 | 12/2014 |
| WO | 2018/125725 A1 | 7/2018 |
| WO | 2018129408 A1 | 7/2018 |
| WO | 2018129409 A1 | 7/2018 |
| WO | 2018129410 A1 | 7/2018 |
| WO | 2018175990 A1 | 9/2018 |
| WO | 2018182812 A2 | 10/2018 |
| WO | 2019079642 A1 | 4/2019 |
| WO | WO2019165095 A1 | 8/2019 |
| WO | WO2019165289 A1 | 8/2019 |
| WO | WO2019165294 A1 | 8/2019 |
| WO | 2020013890 A2 | 1/2020 |

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., six pages.

International Preliminary Report on Patentability and Written Opinion of the International Searching Authority, dated Sep. 18, 2018, for PCT Application No. PCT/US2018/12116, filed Jan. 2, 2018, 11 pages.

International Preliminary Report on Patentability, and Written Opinion dated Jul. 9, 2019, for PCT Application No. PCT/US2018/012703, filed Jan. 5, 2018, 10 pages.

International Preliminary Report on Patentability, dated Jul. 9, 2019, for PCT Application No. PCT/US2018/012704, filed Jan. 5, 2018, 7 pages.

International Preliminary Report on Patentability, dated Jul. 9, 2019, for PCT Application No. PCT/US2018/012705, filed Jan. 5, 2018, 7 pages.

International Search Report and Written Opinion, dated Jul. 9, 2019, for PCT Application No. PCT/US2019/18987, 17 pages.

International Search Report and Written Opinion, dated May 3, 2019, for PCT Application No. PCT/US2019/19272, 16 pages.

International Search Report and Written Opinion, dated May 6, 2019, for PCT Application No. PCT/US2019/19264, 15 pages.

International Search Report and Written Opinion, dated Jan. 3, 2019, for PCT Application No. PCT/US2018/056577, nine pages.

International Search Report, dated Jun. 7, 2018, for PCT Application No. PCT/US2018/24185, filed Mar. 23, 2018, 2 pages.

International Search Report, dated Mar. 19, 2018, for PCT Application No. PCT/US2018/012705, filed Jan. 5, 2018, 2 pages.

International Search Report, dated Mar. 20, 2018, for PCT Application No. PCT/US2018/012703, filed Jan. 5, 2018, 2 pages.

International Search Report, dated Mar. 23, 2018, for PCT Application No. PCT/US2018/012704, filed Jan. 5, 2018, 2 pages.

International Search Report, dated Sep. 18, 2018, for PCT Application No. PCT/US2018/12116, filed Jan. 2, 2018, 2 pages.

Written Opinion of the International Searching Authority, dated Jun. 7, 2018, for PCT Application No. PCT/US2018/24185, filed Mar. 23, 2018, 5 pages.

Written Opinion of the International Searching Authority, dated Mar. 19, 2018, for PCT Application No. PCT/US2018/012705, filed Jan. 5, 2018, 6 pages.

Written Opinion of the International Searching Authority, dated Mar. 20, 2018, for PCT Application No. PCT/US2018/012703, filed Jan. 5, 2018, 9 pages.

Written Opinion of the International Searching Authority, dated Mar. 23, 2018, for PCT Application No. PCT/US2018/012704, filed Jan. 5, 2018, 6 pages.

International Preliminary Report on Patentability dated Apr. 30, 2020, for PCT Application No. PCT/US2018/056577, eight pages.

Non-Final Office Action dated Apr. 1, 2020, for U.S. Appl. No. 15/857,566, filed Dec. 28, 2017, twenty one pages.

Non-Final Office Action dated Jun. 2, 2020, for U.S. Appl. No. 15/934,807, filed Mar. 23, 2018, thirteen pages.

Non-Final Office Action dated Mar. 26, 2020, for U.S. Appl. No. 15/857,563, filed Dec. 28, 2017, twenty three pages.

Non-Final Office Action dated Mar. 30, 2020, for U.S. Appl. No. 15/863,695, filed Jan. 5, 2018, eight pages.

European Search Report, dated Jul. 17, 2020, for EP Application No. 18776977.3, twelve pages.

Extended European Search Report, dated Jul. 10, 2020, for EP Application No. 18736738.8, nine pages.

Gunzung, Kim, et al. (Mar. 2, 2016). "A hybrid 3D LIDAR imager based on pixel-by-pixel scanning and DS-DCDMA," Proceedings

(56) References Cited

OTHER PUBLICATIONS of SPIE; [Proceedings of SPIE ISSN 0277-786X vol. 10524], SPIE, US, vol. 3751, pp. 975119-1-975119-8.
Extended European Search Report, dated Jul. 22, 2020, for EP Application No. 18736685.1, ten pages.
Gluckman, J. (May 13, 2016). "Design of the processing chain for a high-altitude, airborne, single-photon lidar-mapping instrument," Proceedings of SPIE; [Proceedings of SPIE ISSN 0277-786X vol. 10524], SPIE, US, vol. 9832, pp. 983203-983203.
EP2889642 Description translation, created Oct. 3, 2020 from application dated Nov. 11, 2014, 27 pp. (Year: 2020).
Final Office Action dated Oct. 8, 2020, for U.S. Appl. No. 15/857,563, filed Dec. 28, 2017, thirteen pages.
International Search Report and Written Opinion, dated Jan. 17, 2020, for PCT Application No. PCT/US19/19276, 14 pages.
Non-Final Office Action dated Dec. 16, 2020, for U.S. Appl. No. 15/857,566, filed Dec. 28, 2017, eight pages.
Notice of Allowance dated Dec. 2, 2020, for U.S. Appl. No. 15/863,695, filed Jan. 5, 2018, five pages.
Notice of Allowance, (corrected) dated Jan. 8, 2021, for U.S Appl. No. 15/663,695, filed Jan. 5, 2018, two pages.
Notice of Allowance dated Mar. 26, 2021, for U.S. Appl. No. 15/857,566, filed Dec. 28, 2017, ten pages.
Notice of Allowance dated May 17, 2021, for U.S. Appl. No. 15/857,563, filed Dec. 28, 2017, twelve pages.
European Search Reported issued in European Application No. 18868896.4 dated Jun. 17, 2021, 7 pages.
International Search Report issued in International Application No. PCT/US2018/012704 dated Mar. 23, 2018, 2 pages.
International Search Report and Written Opinion issued in International Application No. PCT/US2019/021179 dated Jan. 22, 2020, 10 pages.
International Search Report and Written Opinion issued in International Application No. PCT/US2019/026520 dated Aug. 5, 2019, 11 pages.
International Search Report and Written Opinion issued in International Application No. PCT/US2019/061256 dated Mar. 16, 2020, 10 pages.
"Fiber laser," Wikipedia, https://en.wikipedia.org/wiki/Fiber_laser, 6 pages.
U.S. Appl. No. 16/295,803, filed Mar. 7, 2019.
U.S. Appl. No. 16/546,702, filed Aug. 21, 2019.
U.S. Appl. No. 16/595,904, filed Oct. 8, 2019.
Office Action issued in Japanese Patent Application No. 2019-536019 dated Nov. 30, 2021, 6 pages.

\* cited by examiner

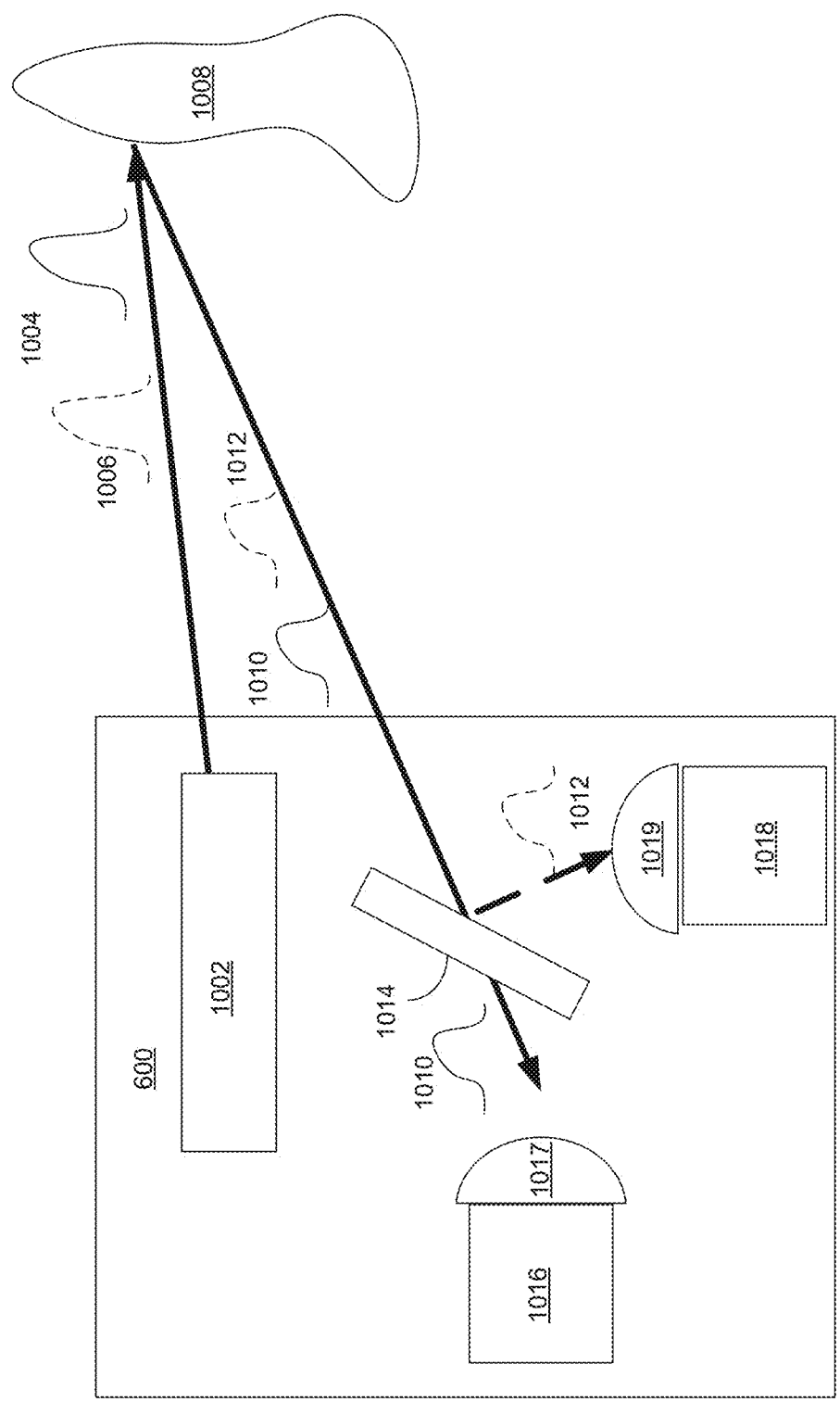

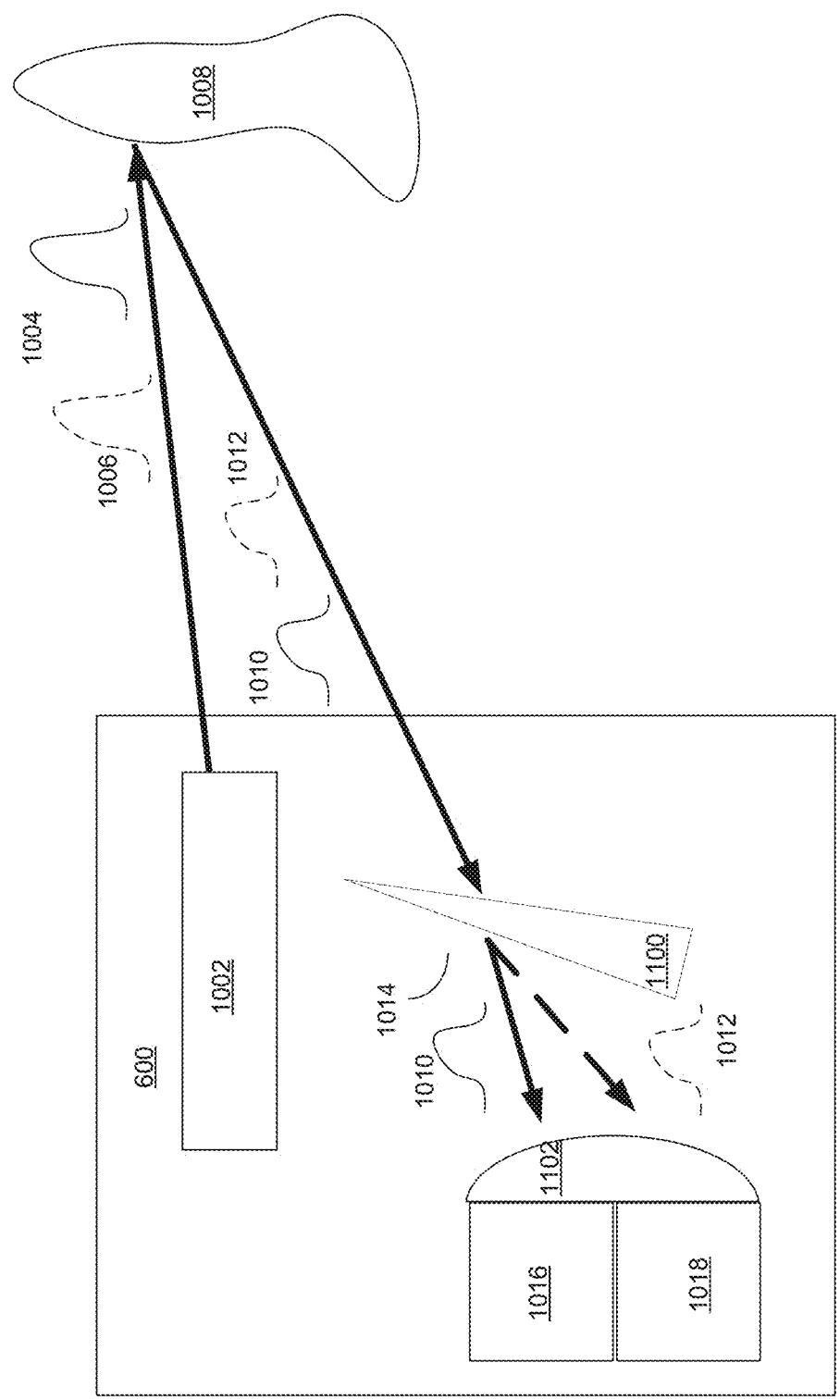

MULTIWAVELENGTH LIDAR DESIGN

CROSS-REFERENCE TO RELATED APPLICATIONS

This application claims priority to U.S. Provisional Patent Application Ser. No. 62/440,818, filed Dec. 30, 2016, entitled "Frequency Modified Laser For Centralized Laser Delivery System In 3d Lidar Design And Fabrication" and U.S. Provisional Patent Application Ser. No. 62/477,740, filed Mar. 28, 2017, entitled "Frequency Modified Laser For Centralized Laser Delivery System In 3d Lidar Design And Fabrication." The content of these applications is hereby incorporated by reference for all purposes.

FIELD

This disclosure relates generally to laser scanning and, more particularly, to the use of multiple wavelength light pulses in light detection and ranging (LiDAR) systems.

BACKGROUND

LiDAR systems scan light pulses to create an image or point cloud of the external environment. Some typical LiDAR systems include a light source, a pulse steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted, the LiDAR system can determine the distance to the object along the path of the transmitted light pulse. By using many light pulses along different paths, an image or point cloud of the surrounding environment is created.

SUMMARY

Examples of the disclosure are directed to a method for enabling light detection and ranging (LiDAR) scanning. The method can be performed by a centralized laser delivery system disposed or included in a vehicle. The method includes receiving a first laser beam having a first wavelength. The first wavelength is outside a wavelength range detectable by a plurality of LiDAR scanners. The method also includes generating a second laser beam based on the first laser beam. The second laser beam has a second wavelength. The second wavelength is within the wavelength range detectable by the plurality of LiDAR scanners. The method further includes providing a plurality of third laser beams based on the second laser beam; and delivering a corresponding third laser beam of the plurality of third laser beams to a respective LiDAR scanner of the plurality of LiDAR scanners. Each LiDAR scanner is disposed at a separate location of the vehicle such that each of the LiDAR scanners is capable of scanning a substantial different spatial range from another LiDAR scanner.

In some embodiments, for LiDAR scanners located in different locations of the system, the system's configurations on detection range and refresh rate can be different (e.g., significantly different). In some examples, the laser system can be configured in a hybrid manner. Some LiDAR scanners may receive a first laser and some LiDAR scanners may receive a second laser that is frequency modified. In this kind of hybrid laser system, for example, a detector in the LiDAR scanner with the first laser may not respond to or detect the light associated with the second laser due to different responsive wavelength range; and similarly, a detector in the LiDAR scanner with the second laser may not respond to or detect the light associated with the first laser due to different responsive wavelength range. In such kind of configurations, the cross talk among the LiDAR scanners within the single system can be reduced or minimized.

Furthermore, in some embodiments, the laser power from the first laser or the second laser can be shared in a time interleaved manner in addition to being distributed among each scanner at a fixed percentage. The duty cycle of each scanner can be determined according to the dark time of each scanner if it is not in a 360 degree scanning, or according to the different priorities in different scenarios. In some embodiments, due to the limited core size of a single-mode fiber, the peak power of a laser can be limited if the beam quality and/or beam divergence is required to satisfy a predetermined condition (e.g., design specification) because of this intrinsic nonlinear effect of fiber. To accommodate this situation, in some examples, a local power booster can be added to the system to amplify the laser power at the scanner location to avoid surpassing the power limit when delivering the light pulses. While the description below uses vehicle as an example, the centralized laser delivery system and multiple LiDARs can be disposed in or integrated with robots, multiple locations of a building for security monitoring purposes, or intersections or certain location of roads for traffic monitoring, and so on.

In another embodiment of the present technology, a light detection and ranging (LiDAR) system having a light source and a light detector transmits, using the light source, a first pulse signal at a first wavelength and a second pulse signal at a second wavelength different from the first wavelength. The first pulse signal and the second pulse signal are transmitted concurrently or consecutively. The light detector detects a first returned pulse signal corresponding to the first pulse signal or the second pulse signal. The LiDAR system determines based on the wavelength of the first returned pulse signal whether the returned pulse signal corresponds to the first pulse signal or the second pulse signal. In accordance with determining that the returned pulse signal corresponds to the first pulse signal, the LiDAR system determines a first range based on timing of receiving the returned pulse signal and transmitting the first pulse signal. In accordance with determining that the returned pulse signal corresponds to the second pulse signal, the LiDAR system determines a second range based on timing of receiving the returned pulse signal and transmitting the second pulse signal.

BRIEF DESCRIPTION OF THE DRAWINGS

FIGS. 7-11 depicts various exemplary LiDAR systems using multi-wavelengths according to some embodiments of the present technology.

DETAILED DESCRIPTION

Figure 1A:
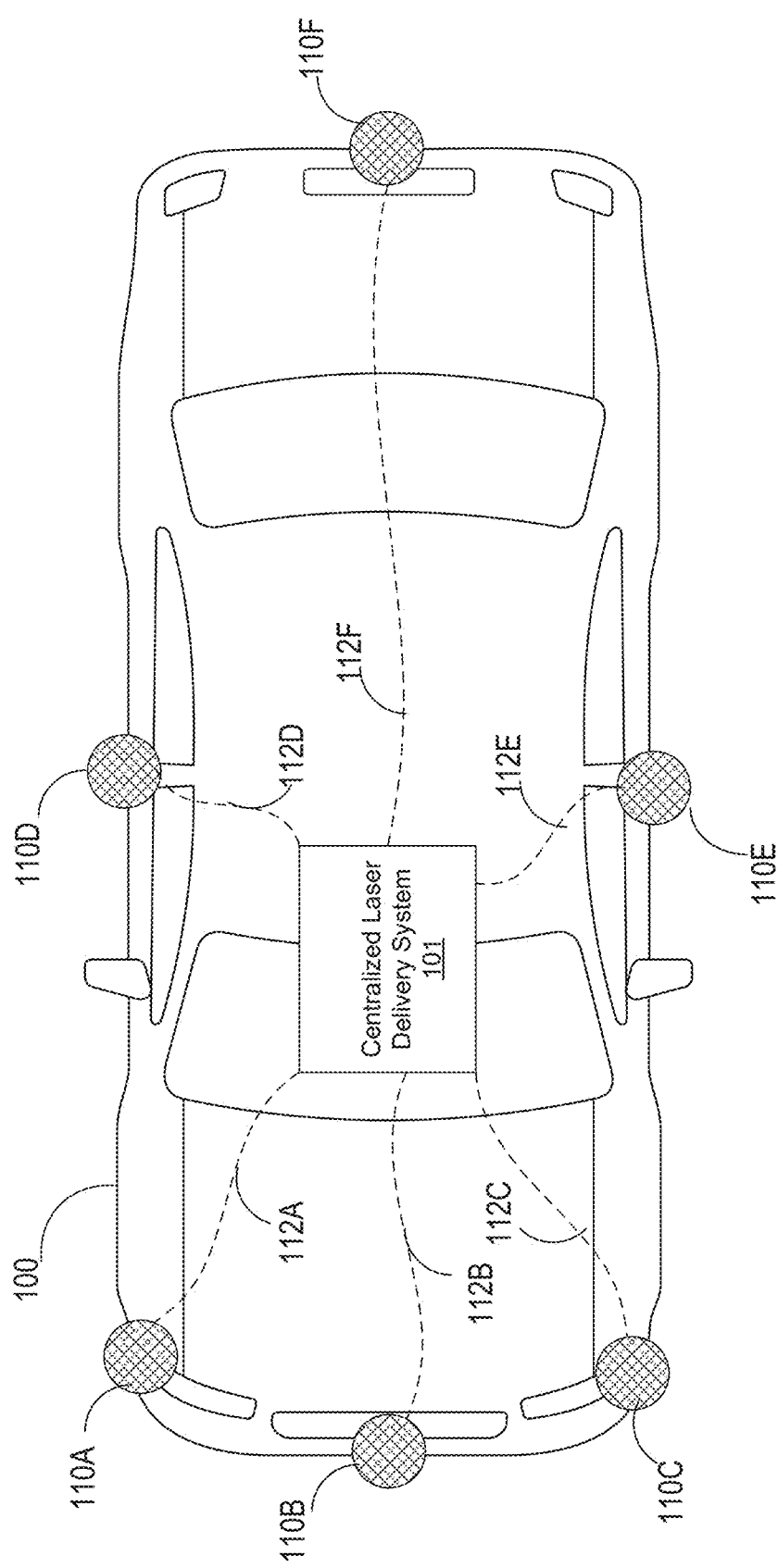
FIG. 1A illustrates an exemplary centralized laser delivery system and multiple LiDAR scanners disposed or included in a vehicle.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Currently, a single LiDAR scanner is typically disposed within or on top of the roof of an autonomous vehicle to detect objects in the vehicle's neighborhood. The LiDAR scanner rotates to steer the laser beam to detect objects surrounding the vehicle. The detection coverage and resolution of a single LiDAR scanner may not be satisfactory or may not meet the requirement for fully autonomous driving. For example, a single LiDAR scanner may simply detect an object located at a certain distance to the vehicle, but cannot provide further information of the object (e.g., height, size, etc.) due to the resolution and detection coverage limit. Thus, it is often desired to have multiple LiDAR scanners.

Current technologies for implementing multiple LiDAR scanners on a vehicle may require each LiDAR scanner to have its own laser source and photodetector. This may result in an expensive system as the number of LiDAR scanners increases and also may result in loss of power efficiencies. Thus, there is a need for a centralized laser delivery system that can provide laser signals to multiple LiDAR scanners from a single laser source. In optical transmission, routing or delivering of laser signals can be performed for laser signals having wavelength of, for example, about 1550 nm. Laser signals having a wavelength of about 1550 nm are frequently used in optical telecommunication for long distance signal transmission and for data modulation. However, detecting the 1550 nm wavelength laser signals requires an expensive InGaAs avalanche photodetectors (APD). An InGaAs APD may have lower detection sensitivity and quality than a typical Silicon APD, which is more frequently used as a detector in the LiDAR scanner. In some examples, InGaAs APD may have a typical noise equivalent power of $10^{-14}$ W/sqrt (Hz), and an intrinsic avalanche gain of about 10 under nominal operation conditions. Further, arrayed InGaAs detector may not be readily available. On the other hand, in the 1550 nm wavelength band, pulsed fiber laser or fiber coupled laser can have good beam quality (e.g., $M^2<1.2$); and the typical peak power can be about 2 kW with tunable pulse width from about 1-5 ns. Moreover, the fiber coupled nature of devices operating in the 1550 nm wavelength band requires minimum or no alignment in an assembly process, thereby enhancing the reliability and robustness.

A LiDAR device typically operates within a wavelength band of about 600-1000 nm, or more specifically about 760-940 nm. In this wavelength band, Si-APD and diode lasers are frequently used. A Si-APD has better detection sensitivity and detection limit than an InGaAs APD; and is relatively inexpensive. For example, a Si-APD may have a typical noise equivalent power of about $10^{-15}$ W/sqrt (Hz), and an intrinsic avalanche gain of about 100 under nominal operation conditions. A Si-APD can also be used to readily form linear or 2D detector arrays. In some examples, the spectrum of Si-based detectors can be from 400 nm to 1100 nm. Moreover, a typical high power pulsed diode laser operating within this spectrum range can have a wavelength of 905 nm and a maximum peak power of 75 W with micro stack structure of three or four layers. The typical laser pulse width is about 5-50 ns. Further, a typical high power pulsed diode laser that operates within this wavelength band may have a laser beam quality (e.g., $M^2$ is about 30) that is worse than that of a pulsed fiber laser or a fiber coupled laser, because of its astigmatic nature.

Thus, there is a need of a centralized laser delivery system that can use 1550 nm wavelength laser signal provided by a high-quality fiber-based laser to perform data modulation and delivering of laser signals to multiple LiDAR scanners, while using a high-quality Si-APD that operates at a wavelength of about 760-940 nm to obtain high detection sensitivity. Combining the fiber-based laser with Si-APD can improve 3D LiDAR performance. A 3D LiDAR scanner can detect and analyze an object or environment to collect data of the object such as distance, shape, dimension, appearance (e.g., color), or the like. The data collected can be used to construct a digital three-dimensional models. Moreover, fiber-based laser source can significantly reduce the alignment requirement and improve manufacturing efficiency. Further, combining fiber-based laser with a modified wavelength (e.g., halved wavelength) with an arrayed silicon detector also enables building a flash type LiDAR, which can avoid or minimize mechanical scanning in a conventional LiDAR design. Further, a centralized laser delivery system provides a flexible system partition that allows fragile modules or sub-systems to be disposed within controlled environment. This reduces overall system requirements. For example, the laser light source can be mounted within the vehicle cabin; and laser light steering portion of sensor can be mounted on the roof, behind the windshield, or embedded in the bumper.

FIG. 1A illustrates an exemplary centralized laser delivery system 101 and multiple LiDAR scanners disposed or included in a vehicle 100. As shown in FIG. 1, a centralized laser delivery system 101 and a plurality of LiDAR scanners 110A-F (collectively as LiDAR scanners 110) are disposed in a vehicle 100. In some embodiments, centralized laser delivery system 101 can be disposed at or integrate with vehicle 100 at a predetermined position. The predetermined position may be at, for example, the center of the vehicle such that the plurality of LiDAR scanners 110A-F is evenly distributed around the predetermined position of centralized laser delivery system 101 to receive laser signals. In some examples, centralized laser delivery system 101 can also be disposed at a convenient position such as in the neighborhood of control circuits of vehicle 100. It is appreciated that centralized laser delivery system 101 can be disposed in any desired position of vehicle 100.

In some embodiments, centralized laser delivery system 101 can provide laser signals to one or more of the plurality of LiDAR scanners 110A-F, depending on the status of vehicle 100. For example, vehicle 100 may be moving forward and thus may require detecting objects positioned in front of and on the two sides of vehicle 100, but may not require detecting objects positioned behind vehicle 100. Accordingly, centralized laser delivery system 101 can provide laser signals to LiDAR scanners 110A-E, but not LiDAR scanner 110F, which is configured to detect objects positioned behind vehicle 100. As another example, vehicle 100 may be moving backward and may require detecting objects positioned behind vehicle 100. Accordingly, centralized laser delivery system 101 can provide laser signals to LiDAR scanners 110F.

In some embodiments, centralized laser delivery system 101 can provide laser signals using one or more channels 112A-F (collectively as channels 112). Channels 112 can be, for example, optical fiber channels. Channels 112 can be flexible and can thus enable routing or delivering laser signals to any LiDAR scanners of vehicle 100. In some embodiments, channels 112 can include single-mode fibers and/or multi-mode fibers. Channels 112 can transmit laser signals having any desired wavelength (e.g., about 1550 nm). A laser signal is a signal that carries information using a laser beam. A laser signal may include one or more laser pulses, photons, or beams. A laser signal can be modulated or unmodulated. A laser signal can also have any wavelength and power.

Figure 1B:
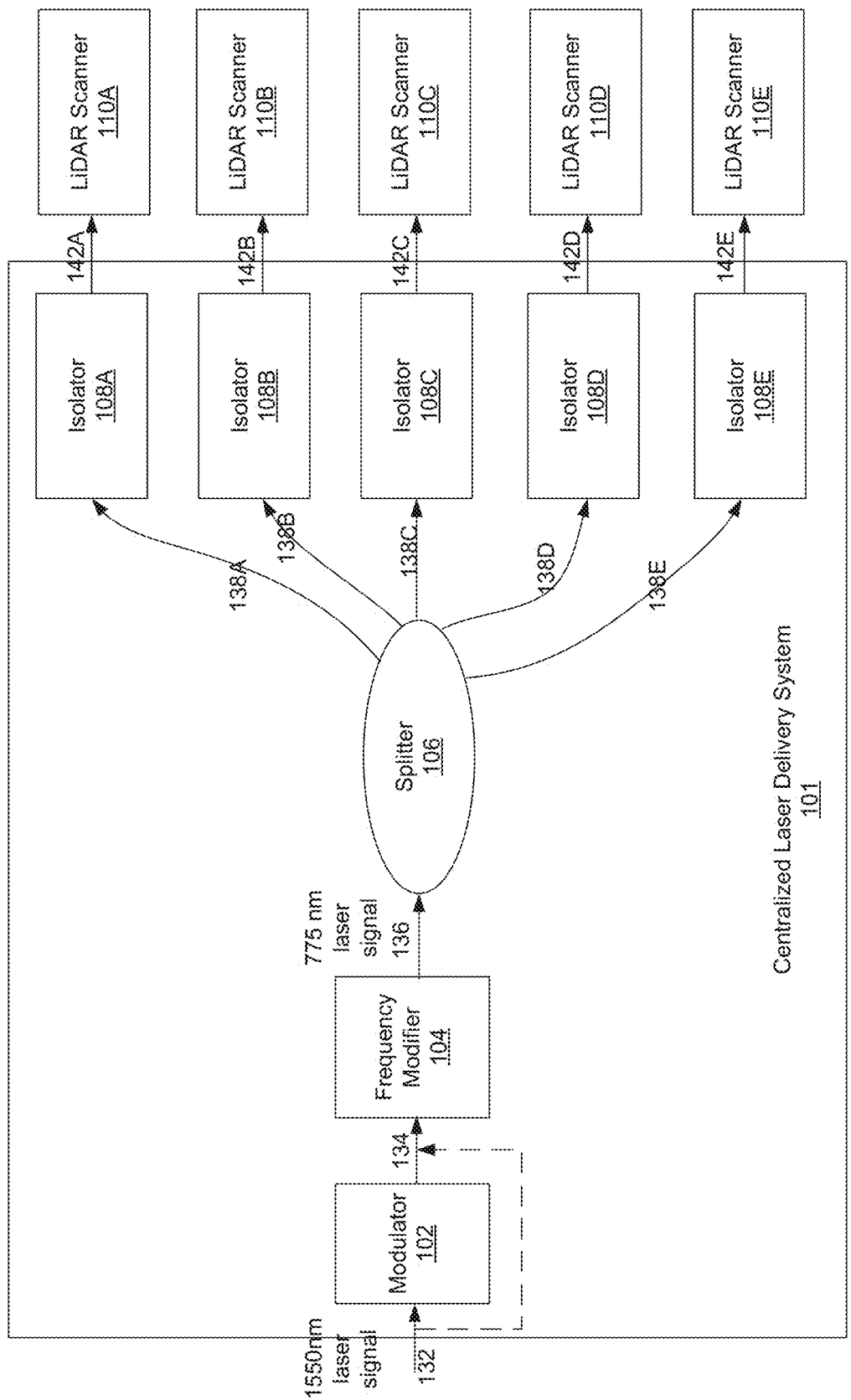
FIG. 1B illustrates a block diagram of an exemplary centralized laser delivery system that enables multiple LiDAR scanning according to examples of the disclosure.

FIG. 1B illustrates a block diagram of an exemplary centralized laser delivery system 101 that enables multiple LiDAR scanning according to examples of the disclosure. In some embodiments, centralized laser delivery system 101 includes a modulator 102, a frequency modifier 104, a splitter 106, and a plurality of isolators 108A-E. Modulator 102 can receive a laser signal 132 from a laser source (not shown). In some examples, laser signal 132 can have a specific wavelength (e.g., 1550 nm) for reducing or minimizing the loss or absorption of a channel for transmitting the laser signals. Laser signal 132 can include, for example, a 1550 nm pulsed laser provided by a pulsed fiber laser or fiber coupled laser (e.g., a free space bulk laser with fiber coupled output). Modulator 102 can perform encoding of laser signal 132. For example, modulator 102 can perform on-off keying (OOK) modulation. The encoding of laser signal 132 can also use a pseudo random bit serial (PRBS) code to enhance the interference immunity of a LiDAR scanner. Furthermore, the splitter 106 can be replaced with a configurable optical add-drop module (OADM), an optical switch, or an optical directional coupler that can be electrically controlled.

In some embodiments, modulator 102 can be an optical modulator including, for example, an amplitude modulator, a phase modulators, and/or a polarization modulator. In some examples, modulator 102 can be an electro-optic modulator including one or more Pockels cells, and optionally additional optical elements such polarizers. In some examples, modulator 102 can also be an acousto-optic modulator or a magneto-optic modulator.

Figure 3:
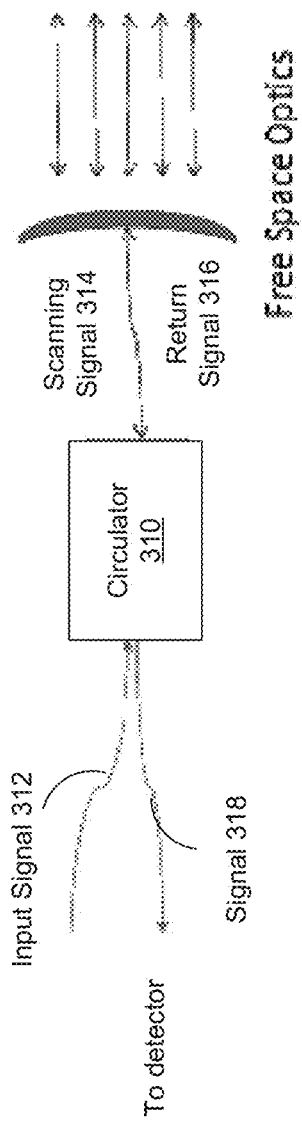
FIG. 3 illustrates an exemplary circulator according to examples of the disclosure.

In some embodiments, as shown in FIG. 1B, modulation can be performed by modulator 102 for laser signal 132 and therefore a modulated signal can be provided to all LiDAR scanners. In some embodiments, as shown in FIG. 3, modulation can be performed on a laser signal transmitted by each individual channel to a corresponding LiDAR scanner. As a result, laser signals transmitted in each individual channel has a different encoding (e.g., using a different PRBS code), thereby further enhancing the interference immunity between LiDAR scanners. FIG. 3 is described in more detail below.

With reference back to FIG. 1B, frequency modifier 104 can receive laser signal 134 (a modulated signal) or laser signal 132 (an unmodulated signal); and modify the frequency (or wavelength) of the received laser signal. For example, laser signal 134 can have a wavelength of 1550 nm, which is a typical wavelength used for optical telecommunication. In some examples, frequency modifier 104 can double the frequency (i.e., reduce the wavelength by half) of laser signal 134. Thus, if laser signal 134 has a wavelength of about 1550 nm, frequency modifier 104 can generate a laser signal 136 having a wavelength of about 775 nm. In some examples, laser signal 136 can have a wavelength within the range of about 775-785 nm and have a peak power of about 1.5 kW.

Figure 2:
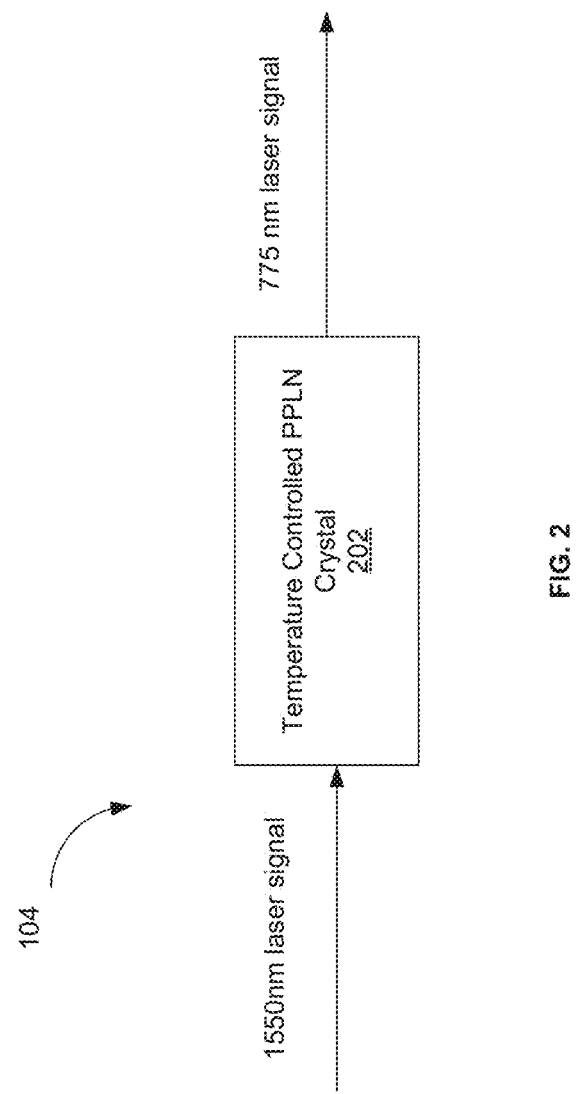
FIG. 2 illustrates an exemplary frequency modifier according to examples of the disclosure.

FIG. 2 illustrates an exemplary frequency modifier 104, which may include a temperature controlled periodical poled lithium niobate (PPLN) crystal 202. A PPLN crystal can be used to perform non-linear wavelength conversion such as frequency doubling, different frequency generation, sum frequency generation, four wave mixing, optical parametric oscillation, and/or other non-linear processes. In some embodiments, changing the temperature of the PPLN crystal can vary phase matching conditions of input photons, which alters the periodicity of the poling in the PPLN crystal. For example, by changing the temperature of the PPLN to a specific temperature, frequency modifier 104 can generate laser signals having about 775 nm wavelength based on the input laser signals having about 1550 nm wavelength. Thus, the frequency of the laser signals is effectively doubled. As described above, the 775 nm wavelength laser signals are within the detection range of about 600-1000 nm of a Si-APD, and therefore can be detected by a Si-APD based LiDAR scanner. In some examples, frequency modification using PPLN crystal can have a conversion efficiency (e.g., 80-90% at about 500 W peak power level) that is acceptable or satisfactory for the purpose of providing laser signals to enable LiDAR scanning.

In some embodiments, frequency modifier 104 can be placed in a temperature controlled environment disposed within vehicle 100. For example, the PPLN crystal may be contained or isolated in an oven, the temperature of which can be controlled to a predetermined temperature or a range of temperatures.

Referring back to FIG. 1B, splitter 106 receives laser signal 136 with a modified wavelength (e.g., about 775 nm), and can generate a plurality of laser signals 138A-E based on laser signal 136. For example, as shown in FIG. 1B, splitter 106 can divide laser signal 136 to multiple laser signals 138A-E, each of which is provided to a respective isolator 108A-E. In some embodiments, splitter 106 can include a passive device such as a beam splitter (e.g., a beam splitting cube, a dichroic mirrored prism, or any desired arrangement of mirrors or prisms). Splitter 106 can also include an active device that provides amplifications or enhancement of the divided laser signals.

As shown in FIG. 1B, in some embodiments, centralized laser delivery system 101 can include one or more isolators 108A-E (collectively as isolators 108). Each of the isolators 108A-E can receive a corresponding laser signal 138A-E, and can provide an output laser signal 142A-E, respectively. As described above, each of laser signals 138A-E can be a modulated and frequency-modified signal. In some examples, isolators 108A-E allow transmitting of laser signals in only one direction. For example, isolator 108A allows transmitting of laser signal 138A to LiDAR scanner 110A, but would block any laser signal or light travelling backwards to splitter 106. Isolator 108A can thus prevent unwanted feedback, such as scattering or reflecting laser signals or light. In some examples, isolators 108 can allow return signals to be delivered to the detectors. Isolators 108 can include one or more of polarization dependent isolators, polarization independent isolators, and/or any other type of isolators. For example, a polarization dependent isolator can include an input polarizer, a Faraday rotator, and an output polarizer. A polarization independent isolator can include an input birefringent wedge, a Faraday rotator, and an output birefringent wedge.

With reference to FIGS. 1A and 1B, in some embodiments, each of laser signals 142A-E can be provided to a respective LiDAR scanner 110A-E for performing laser scanning to detect objects surrounding vehicle 100. A laser signal 142A-E can be provided using a respective channel 112A-E. As described above, channels 112A-E can be, for example, optical fiber channels. Channels 112A-E are flexible and can thus enable routing or delivering laser signals 142A-E to their respective LiDAR scanners of vehicle 100. In some examples, channels 112 can have a length in the range of meters. In some examples, a LiDAR scanner 110 can include scanning optics (e.g., dual oscillating plane mirrors, a polygon mirror, a dual axis scanner), photodetectors (e.g., Si-APD, SiMP), receiver electronics, and/or position and navigation systems. It is appreciated that any number of isolators 108, LiDAR scanners 110, and channels 112 can be used in a vehicle 100 to enable scanning of a desired range of spatial distance/angles for detecting objects around vehicle 100.

With reference to FIGS. 1B and 3, in some embodiments, one or more circulators can be used in conjunction with the centralized laser delivery system 101. For example, one or more circulators can be disposed between isolators 108 and LiDAR scanners 110. A circulator can be a non-reciprocal three- or four-port device (e.g., a waveguide circulator), in which a laser signal entering any port is transmitted to the next port in rotation. A port of the circulator is a point where an external channel or waveguide connects to the circulator.

With reference to FIG. 3, a circulator 310 can be used to build a coaxial transceiver. For example, as shown in FIG. 3, circulator 310 can receive an input signal 312, which may be laser signal 142 (shown in FIG. 1B). Circulator 310 can rotate input signal 312 to the next port and transmit a scanning signal 314 to detect an object within the detection range of a LiDAR scanner. After scanning signal 314 encounters the object, a return signal 316 can be collected via free space optics and received at another port of circulator 310, which then rotates return signal 316 to the next port to provide a signal 318 to a detector for further processing. A detector can be a Si-APD or a silicon photo multiply tube (SiPM) detector. A SiPM detector can have good responsivity towards shorter wavelength (e.g., a wavelength that is shorter than typical LiDAR application wavelength of about 905 nm) and be used to further improve detection sensitivity.

With reference to FIG. 1B, it is appreciated that various other optical components, such as combiner, optical amplifier, and/or high speed amplitude/phase modulator, can also be disposed within or used in conjunction with centralized laser delivery system 101 and/or LiDAR scanner 110A.

For example, under certain circumstances, when extra laser power is required due to scanning range requirements, a local power booster can be added to a nearby location of a LiDAR scanner (e.g., at or nearby the locations of one or more of scanners 110A-E).

Figure 4A:
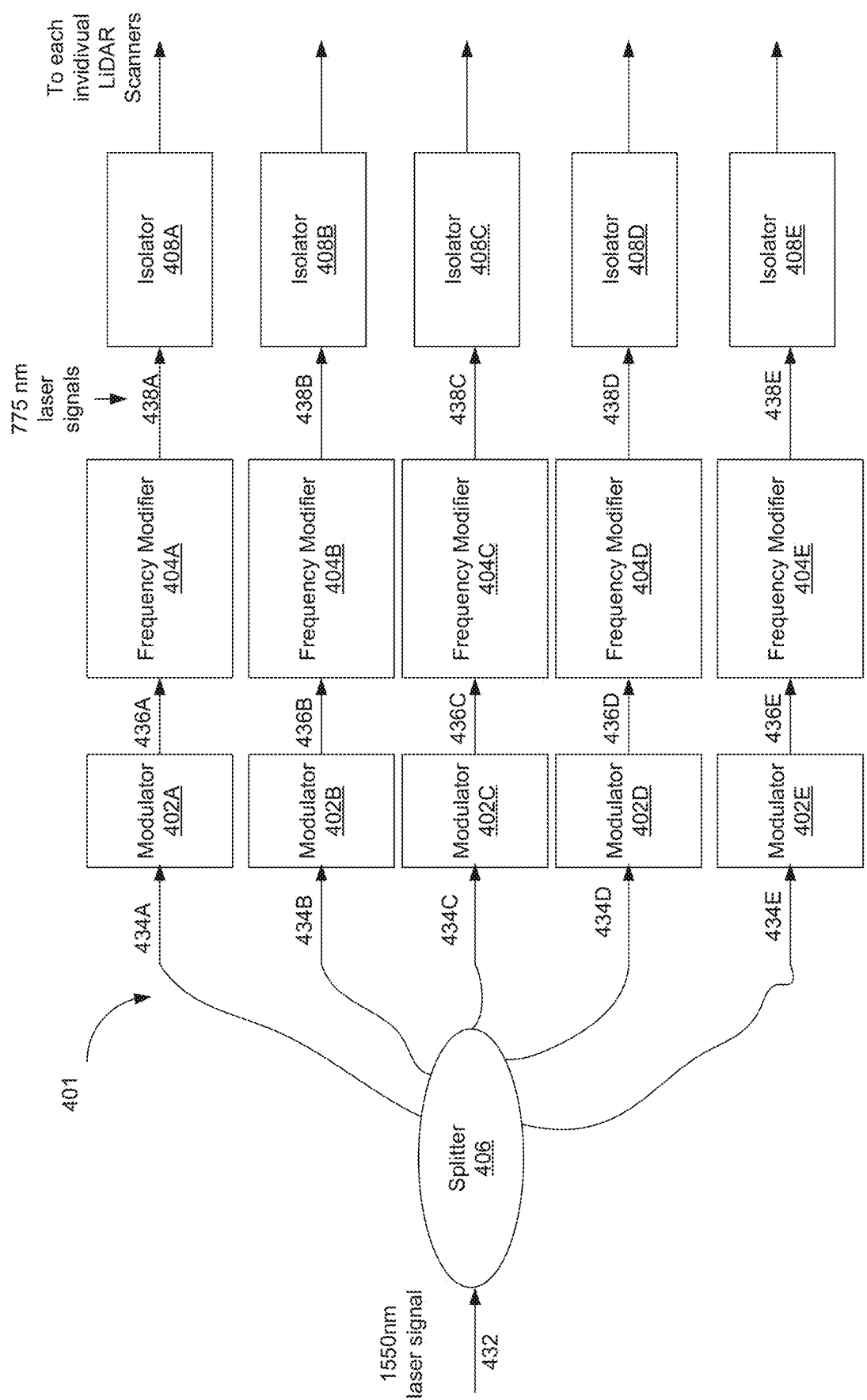
FIG. 4A illustrates a block diagram of another exemplary centralized laser delivery system according to examples of the disclosure.

FIG. 4A illustrates a block diagram of another exemplary centralized laser delivery system 401 according to examples of the disclosure. As shown in FIG. 4A, centralized laser delivery system 401 can include a splitter 406, a plurality of modulators 402A-E (collectively as modulators 402), a plurality of frequency modifiers 404A-E (collectively as frequency modifiers 404), and a plurality of isolators 408A-E (collectively as isolators 408). Splitter 406, modulators 402, and isolators 408 can be similar to those described above in connection with FIG. 1B and therefore are not repeatedly described.

In some embodiments, in centralized laser delivery system 401, splitter 406 can be disposed before modulators 402 and frequency modifiers 404. For example, splitter 406 can receive laser signal 432 from a laser source (not shown), which can have about 1550 nm wavelength. Based on laser signal 432, splitter 406 can generate a plurality of laser signals 434A-E, each of which is provided to a modulator 402A-E, respectively. By disposing splitter 406 before each of modulators 402A-E, the laser signal provided to each LiDAR scanner can be individually modulated. For example, each of laser signals 436A-E generated by respective modulators 402A-E can have different encoding, and in turn each LiDAR scanner can be provided with a laser signal with different encoding (e.g., encoded with a different pseudo random bit serial (PRBS) code). Individually encoding the laser signal for each LiDAR scanner can enhance the interference immunity of the LiDAR scanners. For example, neighboring LiDAR scanners (e.g., LiDAR scanners 110A and 110B shown in FIG. 1A) may have a partially overlapping scanning range such that undesired return signals may be received by the neighboring LiDAR scanners. These undesired return signals may interfere with a neighboring LiDAR scanner. By individually encoding the laser signal for each LiDAR scanner, the interference from undesired return signals can be reduced.

With reference to FIG. 4A, individually modulated laser signals 436A-E can be provided to a respective frequency modifier 404A-E. Frequency modifier 404A-E can generate laser signals 438A-E, respectively. Laser signals 438A-E can have a wavelength that is different from the wavelength of laser signals 436A-E. For example, laser signals 436A-E may have a wavelength of about 1550 nm, and laser signals 438A-E may have a wavelength of about 775 nm. Laser signals 438A-E can then be provided to isolators 408A-E, respectively, and in turn, provided to respective LiDAR scanners. In FIG. 4A, the splitter 406 can be, for example, an OADM, a switch, or a directional coupler. The frequency modifiers 404A-E can be kept in place or removed according to system and local scanner requirements.

Figure 4B:
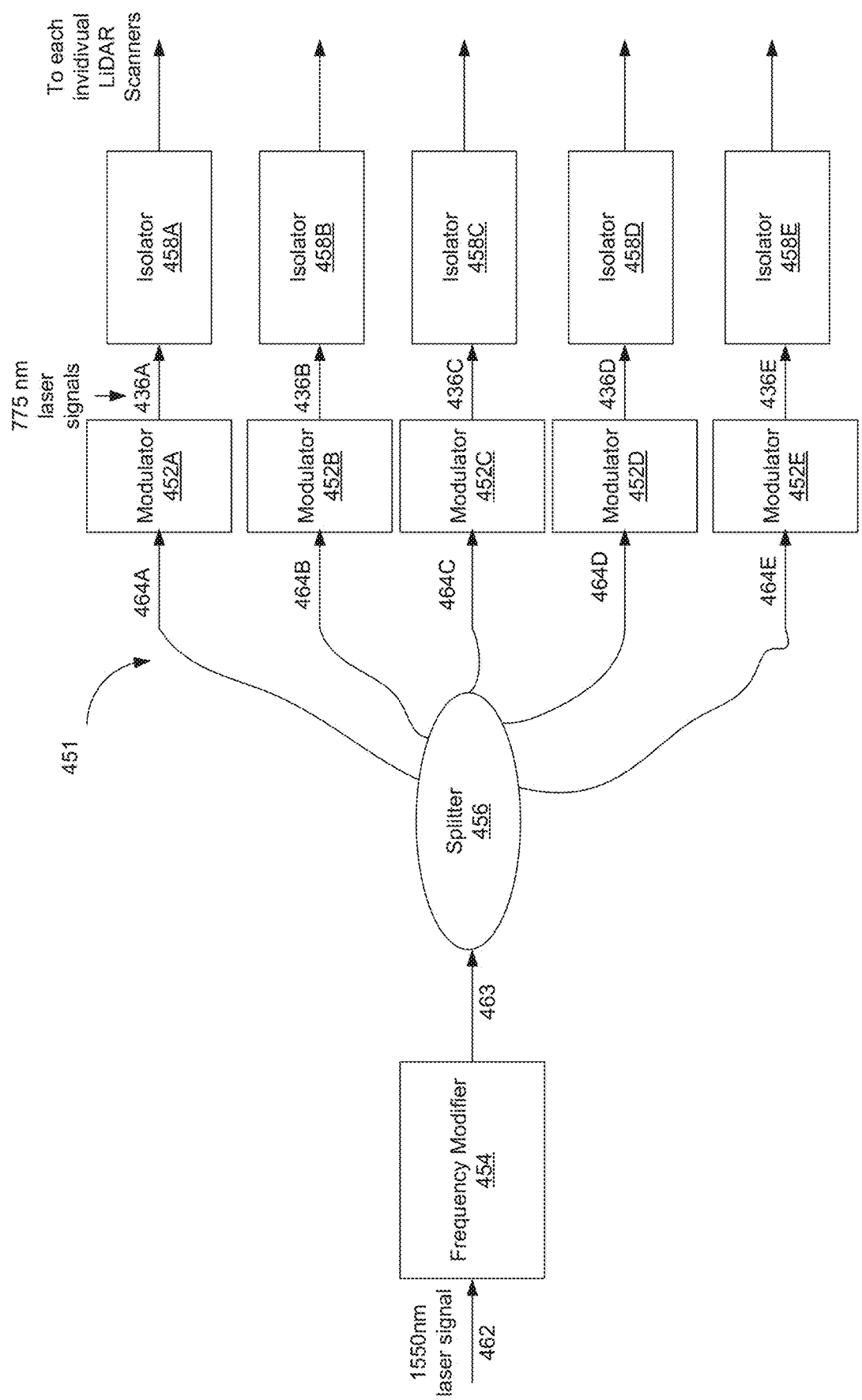
FIG. 4B illustrates a block diagram of another exemplary centralized laser delivery system according to examples of the disclosure.

It is appreciated that a centralized laser delivery system can have various different configurations in addition to the configurations shown in centralized laser delivery system 101 or 401. For example, FIG. 4B illustrates a block diagram of another exemplary centralized laser delivery system 451 according to examples of the disclosure. In FIG. 4B, a single frequency modifier 454 can be disposed before splitter 456 and modulators 452A-E. Frequency modifier 454 can receive a 1550 nm laser signal provided by a fiber-based laser source, and generate laser signal 463 having a wavelength of about 775-785 nm. In this configuration, modulation can still be performed on each laser signal provided to each individual LiDAR scanners, while reducing the number of required frequency modifiers. Furthermore, the splitter 456 can be replaced with, for example, a configurable OADM, an optical switch, or an optical directional coupler that can be electrically controlled.

Figure 5:
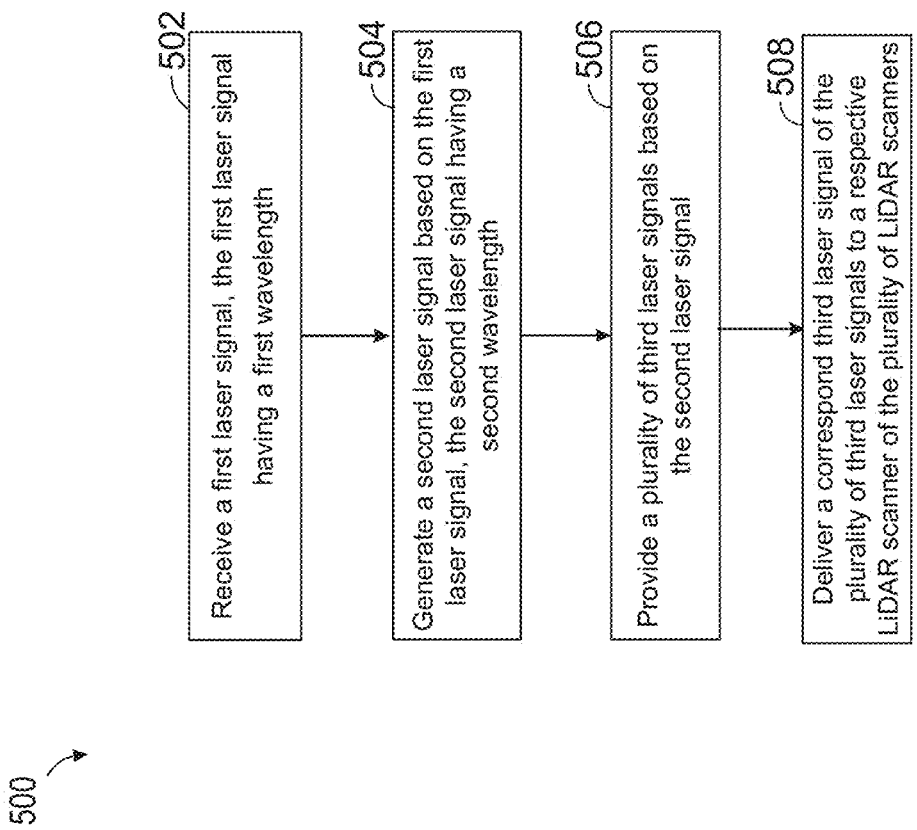
FIG. 5 illustrates an exemplary flow chart for a method performed by a centralized laser delivery system disposed or included in a vehicle.

FIG. 5 illustrates an exemplary process 500 for enabling light detection and ranging (LiDAR) scanning according to examples of the disclosure. At block 502, a first laser signal is received. In some examples, the first laser signal has a first wavelength (e.g., about 1550 nm), and the first wavelength is outside a wavelength range (e.g., 600 nm-1000 nm) detectable by a plurality of LiDAR scanners.

At block 504, a second laser signal is generated based on the first laser signal. In some examples, the second laser signal has a second wavelength (e.g., about 775 nm), and the second wavelength is within the wavelength range (e.g., about 600 nm-about 1000 nm) detectable by the plurality of LiDAR scanners. In some examples, the wavelength range (e.g., about 600 nm-about 1000 nm) detectable by a plurality of LiDAR scanners includes the wavelength range detectable by a silicon-based avalanche photo diode. In some examples, prior to generating the second laser signal, the first laser signal is modulated.

At block 506, a plurality of third laser signals can be provided based on the second laser signal. The third laser signals may be provided using a splitter. At block 508, a corresponding third laser signal of the plurality of third laser signals can be delivered to a respective LiDAR scanner of the plurality of LiDAR scanners. In some examples, each of LiDAR scanners is disposed at a separate location of the vehicle such that each of the LiDAR scanners is capable of scanning a substantial different spatial range from another LiDAR scanner.

Therefore, according to the above, some examples of the disclosure are directed to a method for enabling light detection and ranging (LiDAR) scanning, the method being performed by a system disposed or included in a vehicle, comprising: receiving a first laser signal, the first laser signal having a first wavelength, wherein the first wavelength is outside a wavelength range detectable by a plurality of LiDAR scanners; generating a second laser signal based on the first laser signal, the second laser signal having a second wavelength, wherein the second wavelength is within the wavelength range detectable by the plurality of LiDAR scanners; providing a plurality of third laser signals based on the second laser signal; and delivering a corresponding third laser signal of the plurality of third laser signals to a respective LiDAR scanner of the plurality of LiDAR scanners, wherein each of LiDAR scanner is disposed at a separate location of the vehicle such that each of the LiDAR scanners is capable of scanning a substantial different spatial range from another LiDAR scanner.

Some examples of the disclosure are directed to a system for enabling light detection and ranging, the system being disposed or included in a vehicle, comprising: a plurality of light detection and ranging (LiDAR) scanners, wherein each of LiDAR scanner is disposed at a separate location of the vehicle such that each of the LiDAR scanners is configured to scan a substantial different spatial range from another LiDAR scanner; a frequency modifier configured to receive a first laser signal emitted by a laser source, the first laser signal having a first wavelength, wherein the first wavelength is outside a wavelength range detectable by a plurality of LiDAR scanners; generate a second laser signal based on the first laser signal, the second laser signal having a second wavelength, wherein the second wavelength is within the wavelength range detectable by the plurality of LiDAR scanners; a splitter optically coupled to the frequency modifier, the splitter being configured to provide a plurality of third laser signals based on the second laser signal; and a plurality of laser delivery channels, wherein each of the laser delivery channels being configured to deliver a corresponding third laser signal of the plurality of third laser signals to a respective LiDAR scanner of the plurality of LiDAR scanners.

Figure 6:
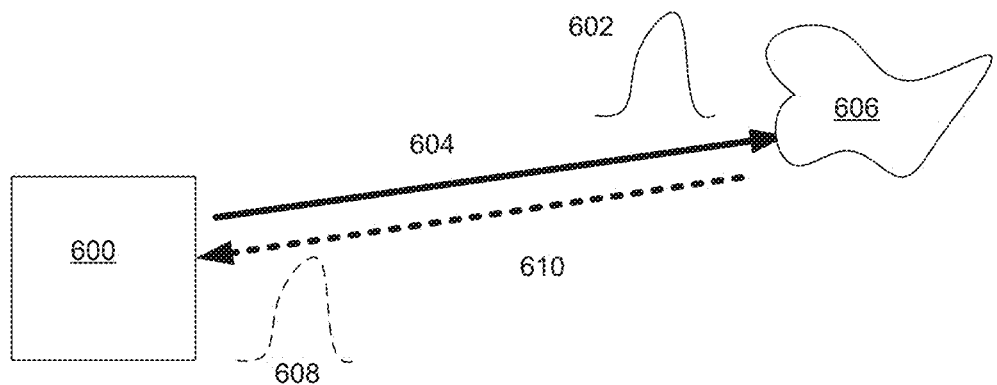
FIG. 6 illustrates an exemplary LiDAR system.

Multi-wavelength light pulses can also be used to provide other advantages in LiDAR systems. Some LiDAR systems use time-of-flight of light to determine the distance to objects in the path of the light. For example, with respect to FIG. 6, LiDAR system 600 (which includes, for example, a laser delivery system (e.g., a laser source such as a fiber laser), a beam steering system (e.g., a system of one or more mirrors), and a light detector system (e.g., a photon detector with one or more optics) transmits light pulse 602 along path 604 as determined by the steering of the LiDAR scanner of system 600. When light pulse 602 reaches object 606, light pulse 608 will be reflected back to system 600 along path 610. The time from when transmitted light pulse 602 leaves LiDAR system 600 to when returned pulse 608 arrives back at LiDAR system 600 can be measured (e.g., by a processor or other electronics within the LiDAR system). This time-of-flight combined with the knowledge of the speed of light can be used to determine the distance from LiDAR system 600 to object 606. Additionally, by directing many light pulses to scan the external environment and using the transmission angle as well as the determined distance between the object and LiDAR system, an image of the surroundings covered within the scanning range (field of view) can be precisely plotted (e.g., a point cloud can be created).

The density of points in the plot is equal to the numbers of pulses divided by the field of view. The density of points is equal to the numbers of pulses divided by the field of view. Given that the field of view is fixed, to increase the density of points, more frequent the LiDAR system should fire a pulse, in another word, higher repetition rate laser is needed. However, by sending more frequent pulses, the furthest distance that the LiDAR system can detect is limited, because the returned signal from far object is received after the system fires the next pulse and the returns may get mixed up. To get enough density of points for relatively far distances, a LiDAR system transmits laser pulses with a repetition rate between 500 kHz and 1 MHz. Based on the time it takes for a pulse to return to the LiDAR system, the farthest distance the LiDAR system can detect is 300 meters and 150 meters for 500 kHz and 1 Mhz, respectively. The density of points of a LiDAR system with 500 kHz repetition rate is half of that with 1 MHz. The present disclosure introduces a practical method to realize a LiDAR system with a high density of points and ability to measure the objects in far distance.

Figure 7:
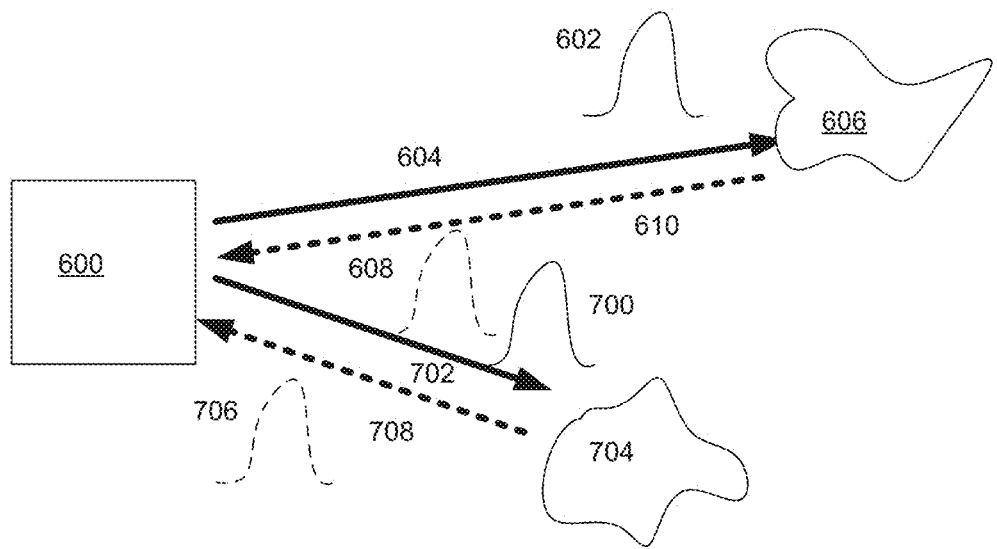

In FIG. 7, LiDAR system 600 has transmitted light pulse 700 along path 702. Object 704 reflects light pulse 706 along path 708 back to LiDAR system 600. Problems can arise when light pulse 602 and 700 are transmitted too close in time. For example, if light pulse 700 is transmitted after light pulse 602 before light pulse 608 is received back at LiDAR system 600, it is necessary to disambiguate whether a returned pulse is from light pulse 602 or 700. Even if light pulse 700 is transmitted after light pulse 602, light pulse 706 may be received before light pulse 608 if object is 704 is closer than object 606. Accordingly, LIDAR system 600 must determine what transmitted light pulse is responsible for a returned pulse before a distance (and, optionally, direction) to an object is determined.

In some embodiments of the present technology, the above problem is solved by using different wavelengths of light. For example, in FIG. 7, LiDAR system 600 transmits light pulse 602 at a first wavelength and transmits light pulse 702 at a second wavelength that is different than the first wavelength. In some cases, LiDAR system 600 can use the frequency modifier technique described above to generate multiple wavelengths. In other cases, LiDAR system 600 can use other techniques (e.g., using multiple laser sources)

to generate different wavelengths for different pulses. When different wavelengths are used for the transmitted pulses, LiDAR system 600 can use the wavelength of the received pulses to determine the corresponding transmitted pulse. Techniques for determining which transmitted light pulse corresponds to a returned light pulse based on the wavelength of the returned light pulse are described below.

In some cases, light pulse 602 and light pulse 700 have substantially the same other characteristics except wavelength (e.g., amplitude, width, etc.) but in some cases, it may be advantageous for the light pulses to be different in other respects. For example, in FIG. 8, the two light pulses 602 and 800 have different amplitudes (as well as different wavelengths) so that the returned pulses 802 and 608 will also have different amplitudes. This is useful, for example, in applications that require dynamic range. A high-amplitude and a low-amplitude pulse are transmitted in a scan location (e.g., when an estimated distance to an object is not known). A higher amplitude light pulse will provide for a stronger corresponding returned pulse (which is more easily detectable by a detector) from an object that is far away as compared to a returned pulse based on a lower amplitude light pulse. The opposite is also true. A lower amplitude light pulse will provide for a more moderate corresponding returned pulse (which does not saturate a detector) from an object that is closer as compared to a returned pulse based on a higher amplitude light pulse. This can ensure that regardless of whether an object is close or far, a returned pulse will produce a signal that is detectable by a detector of LiDAR system 600 but does not saturate the detector. Because the two (or more) light pulses of different amplitude use different wavelengths, it is straight forward for LiDAR system 600 to determine which transmitted light pulse corresponds to which returned pulse.

Figure 8:
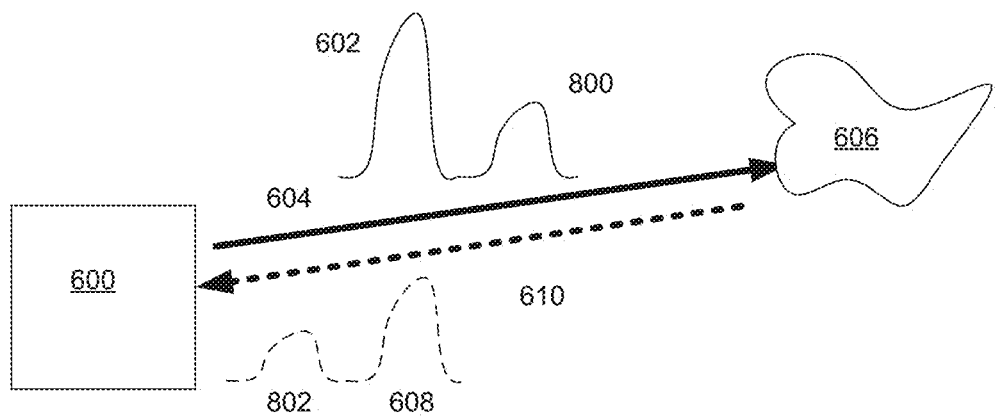
Figure 9A:
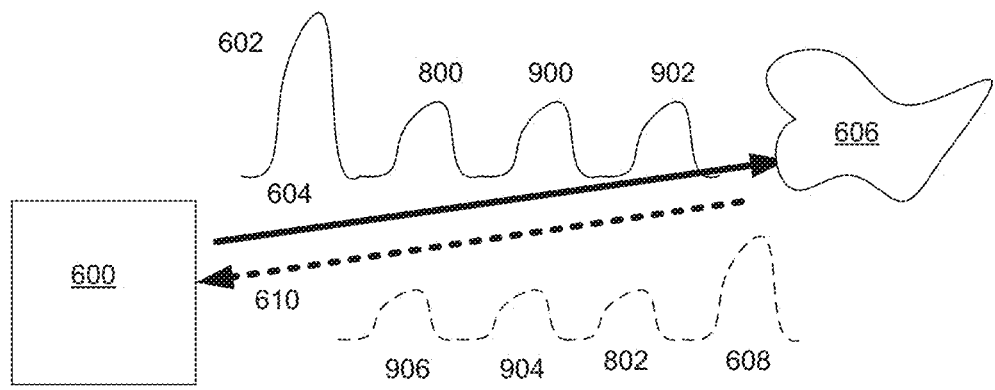
Figure 9B:
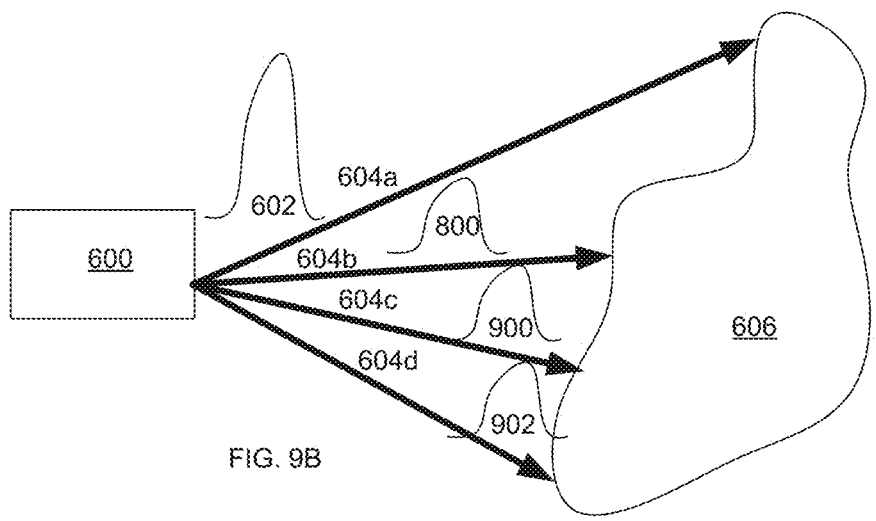

Light pulses of different amplitudes and/or wavelengths need not be alternating or transmitted in the same direction as described with respect to FIG. 8. Instead, they can be transmitted in any useful scan patterns. For example, in FIGS. 9A-9B, the amplitudes of light pulses are chosen based on an anticipated range to an object. Specifically, in FIG. 9A (which is a side view of LiDAR system 600), transmitted light pulses 800, 900, and 902 all have the substantially the same amplitude and are transmitted in sequence before light pulse 602 is transmitted with a higher amplitude. Light pulses 800, 900, and 902 can have different or the same wavelengths (but are generally different than that of light pulse 602). LiDAR system 600 may then repeat this sequence of light pulses (e.g., along a new scan direction) or use a different sequence of light pulses (e.g., based on new anticipated ranges to objects in a new scan direction). As viewed from the side in FIG. 9A, the light pulses are all transmitted along path 604 and light pulses 906, 904, 802, and 608 are received along path 610. When viewed from above, LiDAR system 600 may steer these pulses in different directions (and they may reflect off of different objects). In FIG. 9B (which is a top view of LiDAR system 600), light pulses 602, 800, 900, and 902 are transmitted along paths 604a, 604b, 604c, and 604d, respectively. The high amplitude light pulse 602 is transmitted along path 604a because it has the longest distance before hitting object 606. While the pulses are depicted as being transmitting consecutively in a sequential manner, this need not be the case. For example, light pulses 602 and 800 may be transmitted concurrently so that the pulses are overlapping (this applies to the configuration depicted in FIG. 8 as well).

The wavelength of a returned pulse may be determined using various techniques. For example, the detector of the LiDAR system may provide information regarding the wavelength of the returned pulse. In FIG. 10, LiDAR system 600 includes a detector system using two detectors and one or more dichromatic optical elements, such as a filter or mirror, to determine the wavelength of a returned pulse. LiDAR system 600 includes transmitter 1002 that transmits light pulse 1004 and 1006, each having a different wavelength. These light pulses reflect off of object 1008 to produce light pulses 1010 and 1012 that travel back to LiDAR system 600. Light pulse 1010 travels through dichromatic element 1014 because dichromatic element 1014 has a high transmissivity for the wavelength of light pulse 1010. This allows detector 1016 (behind lens 1017) to detect light pule 1010 and for LiDAR system 600 to determine the wavelength of the returned pulse. In contrast, dichromatic element 1014 reflects light pulse 1012 because dichromatic element 1014 has a high reflectivity for the wavelength of light pulse 1012. This allows light pulse 1014 to be reflected to detector 1018 (behind lens 1019) and for LiDAR system 600 to be able to determine the wavelength of the returned pulse. FIG. 11 depicts an alternative configuration of detectors 1016 and 1018. Instead of using a dichromatic element, dispersion element 1100 (e.g., a prism or grating) is used to direct light pulses 1010 and 1012 to detectors 1016 and 1018, respectively. In this configuration both detectors share lens 1102, which may reduce the overall complexity and cost of the detector system. In some cases, detectors 1016 and 1018 may be the same detector (e.g., use different portions of the same detector).

Figure 12:
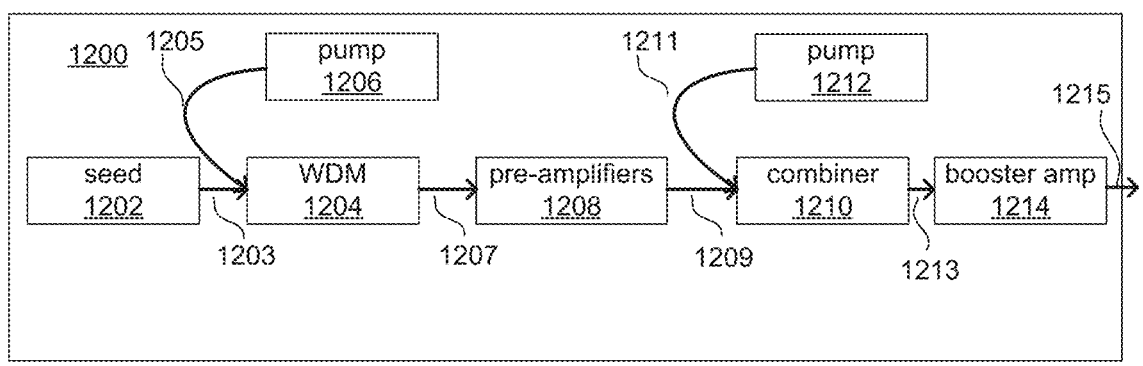
FIG. 12 depicts an exemplary light source.
Figure 13:
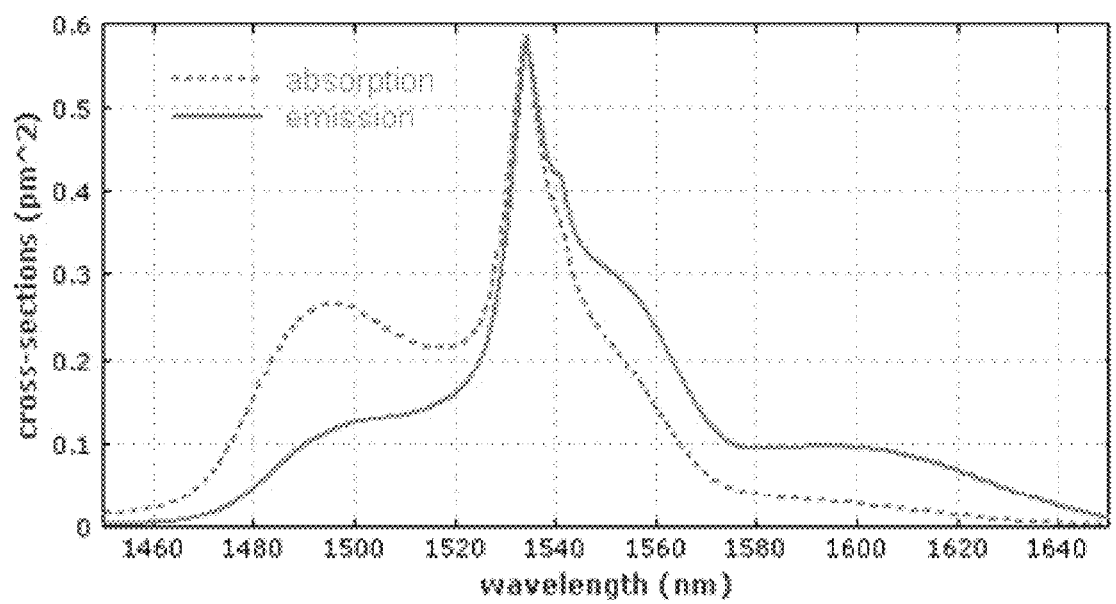
FIG. 13 depicts a fiber gain profile for a range of wavelengths.

FIG. 12 depicts exemplary light source 1200 that is a part of a pulse transmitter (e.g., transmitter 1002 of LiDAR system 600, see FIGS. 6-11). Light source 1200 uses seed 1202 to generate initial light pulses of one or more wavelengths (e.g., 1550 nm), which are provided to wavelength-division multiplexor (WDM) 1204 via fiber 1203. Pump 1206 also provides laser power (of a different wavelength, such as 980 nm) to WDM 1204 via fiber 1205. The output of WDM 1204 is provided to pre-amplifiers 1208 (which includes one or more amplifiers) which provides its output to combiner 1210 via fiber 1209. Combiner 1210 also takes laser power from pump 1212 via fiber 1211 and provides pulses to booster amplifier 1214 via fiber 1213, which produces output light pulses on fiber 1215. The output light pulses can then be steered by a system of one or more reflective components (e.g., a system of one or more mirrors and/or other optical components, such as one or more dispersion optics) of the LiDAR system in order to scan the external environment. Light source 1200 can produce pulses of different amplitudes based on the fiber gain profile of the fiber used in the source (e.g., for use with the techniques described with respect to FIGS. 8-9). For example, FIG. 13 shows an example profile gain that shows how pulses with different wavelengths have different characteristics. Accordingly, the fiber can be chosen so that the responses of the two pulses of different wavelengths have the desired ratio of amplitudes.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims. For example, while the centralized laser delivery system and multiple LiDARs are discussed in the context of being disposed in a vehicle, they can also be disposed in any other systems or devices such as robots, multiple locations of a building for security monitoring purposes, or intersections or certain location of roads for traffic monitoring, and so on. For instance, in a building, one or more LiDAR scanners can be disposed at each desired location (e.g., front door, back door, elevator, etc.) of the building to provide 3D LiDAR scanning for security monitoring purposes. A centralized laser delivery system can be disposed at a central location (e.g., control room of the building) to provide laser signals to the multiple LiDAR scanners. In another example, one or more LiDAR scanners can be disposed at each intersection of a road to monitor the traffic conditions, and a centralized laser delivery system can be disposed at a central location (e.g., traffic control center) to provide laser signals to the multiple LiDAR scanners.

Exemplary methods, non-transitory computer-readable storage media, systems, and electronic devices are set out in the following items:

1. A method for enabling light detection and ranging (LiDAR) scanning, the method being performed by a system disposed or included in a mounting object, comprising:

receiving a first laser signal, the first laser signal having a first wavelength, wherein the first wavelength is within a wavelength range detectable by a first plurality of LiDAR scanners and is outside of a wavelength range detectable by a second plurality of LiDAR scanners; and generating a second laser signal based on the first laser signal, the second laser signal having a second wavelength, wherein the second wavelength is outside of a wavelength range detectable by the first plurality of LiDAR scanners and is within the wavelength range detectable by the second plurality of LiDAR scanners;

2. The method of item 1, the method further comprising:
providing a plurality of third laser signals based on the first laser signal;
providing a plurality of fourth laser signals based on the second laser signal; and
delivering a corresponding third laser signal of the plurality of third laser signals or a corresponding fourth laser signal of plurality of fourth laser signals to a respective LiDAR scanner of the plurality of LiDAR scanners, wherein each of LiDAR scanner is disposed at a separate location of the vehicle such that each of the LiDAR scanners is capable of scanning a substantial different spatial range from another LiDAR scanner.

3. The method of item 1 or item 2, wherein the first wavelength is about 1550 nm and the second wavelength is about 775 nm.

4. The method of any one of items 1-3, wherein generating the second laser signal based on the first laser signal uses a temperature controlled periodical poled lithium niobate crystal.

5. The method of any one of items 1-4, wherein the wavelength range detectable by the first plurality of LiDAR scanners includes the wavelength range detectable by a InGaAs- or SiGe-based avalanche photo diode.

6. The method of any one of items 1-5, wherein the wavelength range detectable by the second plurality of LiDAR scanners includes the wavelength range detectable by a Silicon-based avalanche photo diode.

7. The method of item any one of items 1-6, further comprising:
prior to generating the second laser signal, modulating the first laser signal.

8. A system for enabling light detection and ranging, comprising:
a plurality of light detection and ranging (LiDAR) scanners, wherein each of the LiDAR scanner is disposed at a separate location of the mounting object such that each of the LiDAR scanners is configured to scan a substantial different spatial range from another LiDAR scanner;
a frequency modifier configured to:
receive a first laser signal emitted by a laser source, the first laser signal having a first wavelength, wherein the first wavelength is within the wavelength range detectable by a first plurality of LiDAR scanners and is outside a wavelength range detectable by a second plurality of LiDAR scanners;
generate a second laser signal based on the first laser signal, the second laser signal having a second wavelength, wherein the second wavelength is outside a wavelength range detectable by the first plurality of LiDAR scanners and is within the wavelength range detectable by the second plurality of LiDAR scanners;

9. The system of item 8 wherein the frequency modifier includes:
a first splitter optically coupled to the frequency modifier, the first splitter being configured to provide a plurality of third laser signals based on the first laser signal; and
a second splitter optically coupled to the frequency modifier, the second splitter being configured to provide a plurality of fourth laser signals based on the second laser signal; and the system further comprising:
a plurality of laser delivery channels, wherein each of the laser delivery channels being configured to deliver a corresponding third or fourth laser signal of the plurality of third or fourth laser signals to a respective LiDAR scanner of the plurality of LiDAR scanners.

10. The system of item 8 or 9, wherein the system is for use with a vehicle or integrated in the vehicle.

11. The system of any one of items 8 to 10, wherein the mounting object where the system is disposed in or integrated with includes at least one of:
a robot;
a building to enable security monitoring, wherein the plurality of LiDAR scanners are disposed at a plurality of locations of the building; or
a road to enable traffic monitoring, wherein the plurality of LiDAR scanners are disposed at a plurality of intersections or locations of the road.

12. The system of any one of items 8 to 11, wherein the system includes a hybrid configuration of a first laser and a second laser having modified frequency when it is shared by different LiDAR scanners in the system.

13. The system of any one of items 8 to 12, wherein the laser source is configurable to be shared in a time interleaved manner.

14. The system of any one of items 8 to 13, wherein the laser source is configurable to be time interleaved based on dark time of a plurality of individual LiDAR scanners.

15. The system of any one of items 8 to 14, wherein the laser source is configurable to be time interleaved based on priority of each individual LiDAR scanner due to the external environment.

16. A computer-implemented method, comprising:
in a light detection and ranging (LiDAR) system having a light source and a light detector:
transmitting, using the light source, a first pulse signal at a first wavelength and a second pulse signal at a second wavelength different from the first wavelength, wherein the first pulse signal and the second pulse signal are transmitted concurrently or consecutively;
detecting, using the light detector, a first returned pulse signal corresponding to the first pulse signal or the second pulse signal;

determining based on the wavelength of the first returned pulse signal whether the returned pulse signal corresponds to the first pulse signal or the second pulse signal;

in accordance with determining that the returned pulse signal corresponds to the first pulse signal, determining a first range based on timing of receiving the returned pulse signal and transmitting the first pulse signal; and in accordance with determining that the returned pulse signal corresponds to the second pulse signal, determining a second range based on timing of receiving the returned pulse signal and transmitting the second pulse signal.

17. The method of item 16, wherein the first pulse signal and the second pulse signal are separated by a first time interval.

18. The method of any one of items 16-17, wherein the first pulse signal has a first amplitude, and the second pulse signal has a second amplitude different from the first amplitude;

19. The method of item 18, wherein the first amplitude is greater than the second amplitude.

20. The method of any one of items 16-19, the light source further comprising a fiber having a first gain characteristic at the first wavelength and a second gain characteristics different from the first gain characteristic at a second wavelength;

21. The method of any one of items 16-20, further comprising:

transmitting, using the light source, a third pulse signal at the second wavelength and a fourth pulse signal at the first wavelength, the third pulse signal separated from the second pulse signal by a second time interval, and the fourth pulse signal separated from the first pulse signal by a third time interval different from the second time interval;

detecting, using the light detector, a second returned pulse signal corresponding to the third pulse signal or the fourth pulse signal;

determining based on the wavelength of the second returned pulse signal whether the second returned pulse signal corresponds to the third pulse signal or the fourth pulse signal;

in accordance with determining that the returned pulse signal corresponds to the third pulse signal, determining a third range based on timing of receiving the third returned pulse signal and transmitting the third pulse signal; and in accordance with determining that the returned pulse signal corresponds to the fourth pulse signal, determining a fourth range based on timing of receiving the second returned pulse signal and transmitting the first pulse signal.

22. The method of item 21, wherein the third time interval is greater than the second time interval.

23. The method of any one of items 16-22, wherein the light source includes a first seed configured to produce a first seed pulse signal at the first wavelength and a second seed configured to produce a second pulse signal at the second wavelength.

24. The method of any one of items 16-23, wherein the light detector includes a first detector and a second detector.

25. The method of item 24 wherein a dichromatic optic directs returned pulses of the first wavelength to the first detector and returned pulses of the second wavelength to the second detector.

26. The method of item 24 wherein a dispersion element directs returned pulses of the first wavelength to the first detector and returned pulses of the second wavelength to the second detector.

27. The method of item 26, wherein the first detector and the second detector share a lens.

28. A light detection and ranging (LiDAR) system comprising:
 a light source;
 a light detector;
 a processor coupled to the light source and light detector;
 memory encoded with a computer program for detecting ranges to objects using pulse signals of different wavelengths, the computer program including instructions executable by the processor for:
  transmitting, using the light source, a first pulse signal at a first wavelength and a second pulse signal at a second wavelength different from the first wavelength, wherein the first pulse signal and the second pulse signal are transmitted concurrently or consecutively;
  detecting, using the light detector, a first returned pulse signal corresponding to the first pulse signal or the second pulse signal;
  determining based on the wavelength of the first returned pulse signal whether the returned pulse signal corresponds to the first pulse signal or the second pulse signal;
  in accordance with determining that the returned pulse signal corresponds to the first pulse signal, determining a first range based on timing of receiving the returned pulse signal and transmitting the first pulse signal; and
  in accordance with determining that the returned pulse signal corresponds to the second pulse signal, determining a second range based on timing of receiving the returned pulse signal and transmitting the second pulse signal.

29. The LiDAR system of item 28, wherein the first pulse signal and the second pulse signal are separated by a first time interval.

30. The LiDAR system of any one of items 28-29, wherein the first pulse signal has a first amplitude, and the second pulse signal has a second amplitude different from the first amplitude;

31. The LiDAR system of item 30, wherein the first amplitude is greater than the second amplitude.

32. The LiDAR system of any one of items 28-31, the light source further comprising a fiber having a first gain characteristic at the first wavelength and a second gain characteristics different from the first gain characteristic at a second wavelength;

33. The LiDAR system of any one of items 28-32, the computer program further including instructions executable by the processor for:
  transmitting, using the light source, a third pulse signal at the second wavelength and a fourth pulse signal at the first wavelength, the third pulse signal separated from the second pulse signal by a second time interval, and the fourth pulse signal separated from the first pulse signal by a third time interval different from the second time interval;
  detecting, using the light detector, a second returned pulse signal corresponding to the third pulse signal or the fourth pulse signal;
  determining based on the wavelength of the second returned pulse signal whether the second returned pulse signal corresponds to the third pulse signal or the fourth pulse signal;
  in accordance with determining that the returned pulse signal corresponds to the third pulse signal, determining a third range based on timing of receiving the third returned pulse signal and transmitting the third pulse signal; and
  in accordance with determining that the returned pulse signal corresponds to the fourth pulse signal, determining a fourth range based on timing of receiving the second returned pulse signal and transmitting the first pulse signal.

34. The LiDAR system of item 33, wherein the third time interval is greater than the second time interval.

35. The LiDAR system of any one of items 28-34, wherein the light source includes a first seed configured to produce a first seed pulse signal at the first wavelength and a second seed configured to produce a second pulse signal at the second wavelength.

36. The LiDAR system of any one of items 28-35, wherein the light detector includes a first detector and a second detector.

37. The LiDAR system of item 36 wherein a dichromatic optic directs returned pulses of the first wavelength to the first detector and returned pulses of the second wavelength to the second detector.

38. The LiDAR system of item 36 wherein a dispersion element directs returned pulses of the first wavelength to the first detector and returned pulses of the second wavelength to the second detector.

39. The LiDAR system of item 38, wherein the first detector and the second detector share a lens.

The invention claimed is:

1. A method for enabling light detection and ranging (LiDAR) scanning, comprising:
    at a centralized laser delivery system mounted on an object:
        receiving a laser signal from a laser source, the laser signal having a first wavelength, wherein the first wavelength is within a wavelength range detectable by a first type of LiDAR scanner and is outside of a wavelength range detectable by a second type of LiDAR scanner;
        modifying the laser signal to generate a modified laser signal, the modified laser signal having a second wavelength, wherein the second wavelength is outside of a wavelength range detectable by the first type of LiDAR scanner and is within the wavelength range detectable by the second type of LiDAR scanner;
        dividing the modified laser signal to generate a plurality of signals; and
        delivering the plurality of signals to a plurality of second type of LiDAR scanners mounted on or in proximity to the object, wherein each of the plurality of signals is delivered to a respective LiDAR scanner of the plurality of second type of LiDAR scanners.

2. The method of claim 1, wherein each of the plurality of second type of LiDAR scanners is disposed at a separate location of the object such that each of the plurality of second type of LiDAR scanners is capable of scanning a substantially different spatial range from another second type of LiDAR scanner.

3. The method of claim 1, wherein the first wavelength is about 1550 nm and the second wavelength is about 775 nm.

4. The method of claim 1, wherein modifying the laser signal to generate the modified laser signal comprises using a temperature controlled periodical poled lithium niobate crystal.

5. The method of claim 1, wherein the wavelength range detectable by the first type of LiDAR scanner includes a wavelength range detectable by a InGaAs- or SiGe-based avalanche photo diode.

6. The method of claim 1, wherein the wavelength range detectable by the second type of LiDAR scanner includes a wavelength range detectable by a Silicon-based avalanche photo diode.

7. The method of claim 1, further comprising:
    prior to generating the modified laser signal, modulating the first laser signal.

8. A system for enabling light detection and ranging, comprising:
    a plurality of light detection and ranging (LiDAR) scanners, wherein each of the plurality of LiDAR scanners is disposed at a separate location of a mounting object such that each of the plurality of LiDAR scanners is configured to scan a substantially different spatial range from another LiDAR scanner;
    a frequency modifier configured to:
        receive a laser signal emitted by a laser source, the laser signal having a first wavelength, wherein the first wavelength is within a wavelength range detectable by a first type of LiDAR scanner and is outside of a wavelength range detectable by a second type of LiDAR scanner;
        generate a modified laser signal by modifying the laser signal, the modified laser signal having a second wavelength, wherein the second wavelength is outside of a wavelength range detectable by the first type of LiDAR scanner and is within the wavelength range detectable by the second type of LiDAR scanner, and the plurality of LiDAR scanners is a plurality of second type of LiDAR scanners;
    a splitter optically coupled to the frequency modifier, the splitter configured to provide a plurality of laser signals by dividing the modified laser signal; and
    a plurality of laser delivery channels, wherein each of the laser delivery channels is configured to deliver a respective laser signal of the plurality of laser signals to a respective LiDAR scanner of the plurality of LiDAR scanners.

9. The system of claim 8, wherein the system is for use with a vehicle or integrated in the vehicle.

10. The system of claim 8, wherein the mounting object where the system is disposed in or integrated with includes at least one of:
    a robot;
    a building to enable security monitoring, wherein the plurality of LiDAR scanners are disposed at a plurality of locations of the building; or
    a road to enable traffic monitoring, wherein the plurality of LiDAR scanners are disposed at a plurality of intersections or locations of the road.

11. The system of claim 8, wherein the system includes a hybrid configuration of a first laser and a second laser having modified frequency when the laser signal or the modified laser signal is shared by different LiDAR scanners in the system.

12. The system of claim 8, wherein the laser source is configurable to be shared in a time interleaved manner.

13. The system of claim 8, wherein the laser source is configurable to be time interleaved based on dark time of one of the plurality of individual LiDAR scanners.

14. The system of claim 8, wherein the laser source is configurable to be time interleaved based on priority of one of the plurality of LiDAR scanners due to an external environment.

* * * * *